US007900161B2

(12) United States Patent
Nakamura et al.

(10) Patent No.: US 7,900,161 B2
(45) Date of Patent: Mar. 1, 2011

(54) DATA DISPLAY APPARATUS, DATA DISPLAY METHOD, DATA DISPLAY PROGRAM AND GRAPHICAL USER INTERFACE

(75) Inventors: Takatoshi Nakamura, Kanagawa (JP); Yuichi Abe, Tokyo (JP); Yoichiro Sako, Tokyo (JP); Toru Sasaki, Tokyo (JP); Toshiro Terauchi, Tokyo (JP); Katsuya Shirai, Kanagawa (JP); Mitsuru Takehara, Tokyo (JP); Masamichi Asukai, Kanagawa (JP)

(73) Assignee: Sony Corporation, Tokyo (JP)

( * ) Notice: Subject to any disclaimer, the term of this patent is extended or adjusted under 35 U.S.C. 154(b) by 572 days.

(21) Appl. No.: 11/633,314

(22) Filed: Dec. 4, 2006

(65) Prior Publication Data

US 2007/0220431 A1   Sep. 20, 2007

(30) Foreign Application Priority Data

Dec. 9, 2005   (JP) .............................. 2005-356975

(51) Int. Cl.
  *G06F 3/048* (2006.01)
(52) U.S. Cl. ........................ 715/830; 715/716; 715/810
(58) Field of Classification Search ................. 715/810, 715/830
  See application file for complete search history.

(56) References Cited

U.S. PATENT DOCUMENTS

| 5,966,121 | A | 10/1999 | Hubbell et al. |
| 5,974,386 | A | 10/1999 | Ejima et al. |
| 6,085,185 | A | 7/2000 | Matsuzawa et al. |
| 6,154,218 | A | 11/2000 | Murase et al. |
| 6,538,698 | B1 * | 3/2003 | Anderson .............. 348/333.05 |
| 6,750,888 | B1 * | 6/2004 | Nakagawa .................. 715/800 |
| 6,751,354 | B2 | 6/2004 | Foote et al. |
| 6,774,917 | B1 | 8/2004 | Foote et al. |
| 6,782,402 | B1 | 8/2004 | Hidaka et al. |
| 7,039,860 | B1 | 5/2006 | Gautestad |
| 7,246,314 | B2 | 7/2007 | Foote et al. |
| 7,315,386 | B1 | 1/2008 | Shiimori et al. |
| 7,327,347 | B2 * | 2/2008 | Hilbert et al. ............... 345/156 |
| 7,437,005 | B2 * | 10/2008 | Drucker et al. .............. 382/224 |
| 2002/0069218 | A1 | 6/2002 | Sull et al. |
| 2003/0128103 | A1 * | 7/2003 | Fitzpatrick et al. ........ 340/425.5 |
| 2004/0013416 | A1 | 1/2004 | Mok |
| 2004/0098379 | A1 | 5/2004 | Huang |

(Continued)

FOREIGN PATENT DOCUMENTS

EP   1531404 A   5/2005

(Continued)

*Primary Examiner* — William L Bashore
*Assistant Examiner* — Ashraf Zahr
(74) *Attorney, Agent, or Firm* — Wolf, Greenfield & Sacks, P.C.

(57) ABSTRACT

A data display apparatus includes: an extraction condition setting section that sets, based on an original data row where a plurality of data are arranged in a predetermined order, an extraction condition of extraction data that is to be displayed on a predetermined display section; and an extraction data display section that displays, out of an extraction data row where the extraction data extracted from the original data row based on the extraction condition are arranged in the predetermined order, the extraction data that are within a predetermined range in a predetermined display size on the display section.

23 Claims, 21 Drawing Sheets

U.S. PATENT DOCUMENTS

| | | |
|---|---|---|
| 2004/0119722 A1* | 6/2004 | Hilbert et al. ............... 345/619 |
| 2004/0134978 A1 | 7/2004 | Hara et al. |
| 2004/0243648 A1 | 12/2004 | Hidaka et al. |
| 2005/0008264 A1 | 1/2005 | Iida et al. |
| 2005/0044091 A1 | 2/2005 | Nakamura et al. |
| 2005/0071762 A1 | 3/2005 | Kim et al. |
| 2005/0114374 A1* | 5/2005 | Juszkiewicz et al. ........ 707/101 |
| 2005/0138009 A1 | 6/2005 | Deshpande |
| 2005/0171947 A1 | 8/2005 | Gautestad |
| 2005/0185225 A1 | 8/2005 | Brawn et al. |
| 2005/0234896 A1* | 10/2005 | Shima et al. ................... 707/3 |
| 2005/0259957 A1 | 11/2005 | Jung et al. |
| 2006/0190817 A1* | 8/2006 | Banks ....................... 715/526 |
| 2007/0022382 A1 | 1/2007 | Honkaniemi |
| 2007/0083911 A1* | 4/2007 | Madden et al. ............. 725/135 |
| 2007/0139410 A1 | 6/2007 | Abe et al. |
| 2007/0160345 A1 | 7/2007 | Sakai et al. |
| 2008/0126996 A1* | 5/2008 | Morris et al. ............... 715/854 |

FOREIGN PATENT DOCUMENTS

| | | |
|---|---|---|
| JP | 11-085450 A | 3/1999 |
| JP | 2000-122781 A | 4/2000 |
| JP | 2001-297090 A | 10/2001 |
| JP | 2002-157059 A | 5/2002 |
| JP | 2003-150293 A | 5/2003 |
| JP | 2003-150604 A | 5/2003 |
| JP | 2004-295231 A | 10/2004 |
| JP | 2004-356774 A | 12/2004 |
| JP | 2005-130275 A | 5/2005 |
| WO | WO 2005/088475 A | 9/2005 |
| WO | 2005/109157 A1 | 11/2005 |

* cited by examiner

TBL1 CONTENT DATA MANAGEMENT TABLE

| CONTENT ID | CONTENT NAME |
|---|---|
| 0001 | Music_server/music1.mp3 |
| 0002 | Music_server2/music2.mp3 |
| 1001 | My_photo1.jpg |
| 1002 | Jacket_server/jacket11.jpg |
| ... | ... |

FIG.4A

TBL2 CONTENT METADATA MANAGEMENT TABLE

| CONTENT ID | CONTENT METADATA NAME |
|---|---|
| 0001 | Music_server/music1_meta.mta |
| 0002 | Music_server2/music2_meta.mta |
| 1001 | My_photo1_meta.mta |
| 1002 | Jacket_server2/jacket11_meta.mta |
| ... | ... |

FIG.4B

MTD
| MUSIC NAME | RED FLOWERS | | | | | |
|---|---|---|---|---|---|---|
| ARTIST NAME | MATSUMOTO SEIJI | | | | | |
| RELEASE DATE | 1981/7/7 | | | | | |
| TOTAL SALES NUMBERS | 1592845 | | | | | |
| ANNUAL RANKING | 1981 TO 1984 | 2ND | 4TH | | 50 TH | 112 |
| MONTHLY RANKING | 1981/7~84/12 | • | • | 4 5 6 3 1 8 | • • | • |
| WEEKLY RANKING | • • • • • • • • • • | | | | | |
| USER RATING | 4 | | | | | |
| PRIORITY | • • • | | | | | |
FIG. 13
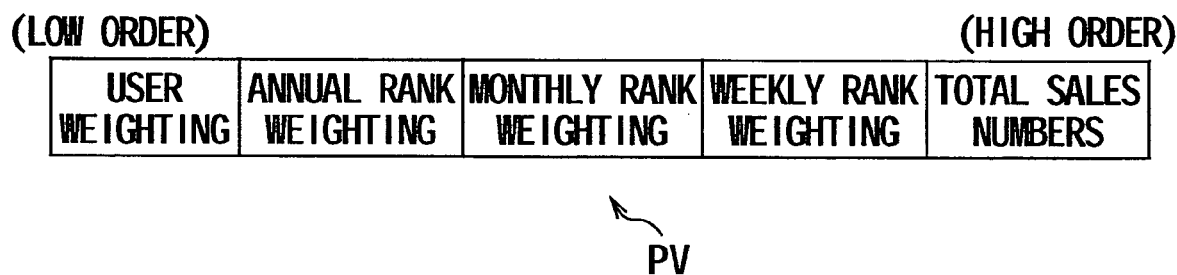
FIG. 14
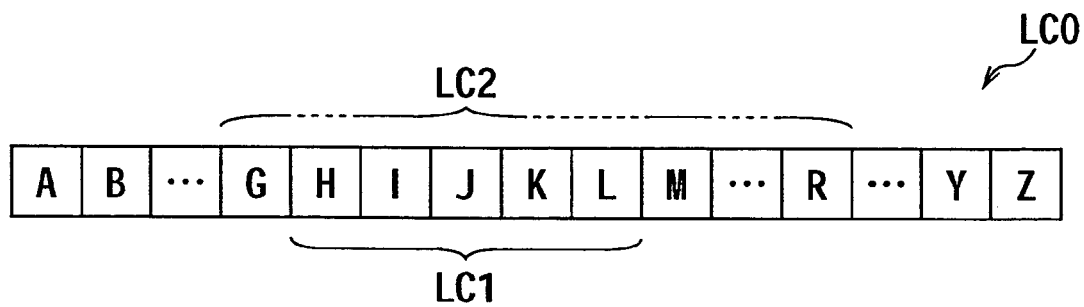
FIG. 15

DATA DISPLAY APPARATUS, DATA DISPLAY METHOD, DATA DISPLAY PROGRAM AND GRAPHICAL USER INTERFACE

CROSS REFERENCES TO RELATED APPLICATIONS

The present invention contains subject matter related to Japanese Patent Application JP2005-356975 filed in the Japanese Patent Office on Dec. 9, 2005, the entire contents of which being incorporated herein by reference.

BACKGROUND OF THE INVENTION

1. Field of the Invention

The present invention relates to a data display apparatus, data display method, data display program and graphical user interface, and is preferably applied to a case in which a user is provided with a user interface to easily retrieve his/her desired piece of music data from a large amount of music data, for example.

2. Description of the Related Art

In recent years, it has become possible that a content playback device can store a large amount of digital data (content), such as music and video data, in a large-capacity hard disk. The content playback device is also capable of acquiring the digital data from external servers or the like through a high-speed network or the like and playing pack a piece of content specified by a user.

A content playback device that allows a user to easily select a piece of content is disclosed because it displays thumbnails, each of which is associated with each piece of content, in a list format after classifying them by type (media). (see Jpn. Pat. Laid-open Publication No. 2004-356774, for example)

SUMMARY OF THE INVENTION

By the way, an audio device that plays back pieces of music content is capable of storing many pieces of music content (thousands to ten thousands of music content, for example) in the internal hard disk. However, because the number of pixels on display panels or the like is limited, they just display a very limited number of thumbnail images on one screen and the size of images is limited.

If the number of thumbnail images to be displayed on a screen of the audio device is decreased, a user who is selecting a piece of music content can easily recognize each thumbnail, however, it would be troublesome because they may have to perform many operations, such as move or scroll.

If the number of thumbnail images to be displayed on a screen of the audio device is increased, the size of thumbnail images may be reduced due to the conditions of the display panel. In this case, the user has difficulty in finding out his/her desired piece of content because it is difficult to recognize each thumbnail.

The present invention has been made in view of the above points and is intended to provide a data display apparatus, data display method, data display program and graphical user interface that allows a user to easily recognize a plurality of data displayed.

In one aspect of the present invention, a data display apparatus, data display method and data display program performs the steps of: setting, based on an original data row where a plurality of data are arranged in a predetermined order, an extraction condition of extraction data that is to be displayed on a predetermined display section; and displaying, out of an extraction data row where the extraction data extracted from the original data row based on the extraction condition are arranged in the predetermined order, the extraction data that are within a predetermined range in a predetermined display size on the display section.

Accordingly, only the extraction data extracted from all data based on the extraction condition are displayed in a predetermined display size such that the relative order of extraction data on the original data row is maintained.

In another aspect of the present invention, a graphical user interface, which displays both a selection operation of selecting data to be displayed on a display section through an input section and an interface action of an information processing apparatus based on the selection operation as an image on the display section, performs the steps of: setting, based on an original data row where a plurality of data are arranged in a predetermined order, an extraction condition of extraction data that is to be displayed on the display section; and displaying, out of an extraction data row where the extraction data extracted from the original data row based on the extraction condition are arranged in the predetermined order, the extraction data that are within a predetermined range in a predetermined display size on the display section.

Accordingly, in response to the input operation, only the extraction data extracted from all data based on the extraction condition are displayed in a predetermined display size such that the relative order of extraction data on the original data row is maintained.

In another aspect of the present invention, a data display apparatus includes: cull condition setting means for setting a cull condition to cull exclusion data that a display section does not display from an original data row where a plurality of data are arranged in a predetermined order; and extraction data display means for displaying, out of an extraction data row where extraction data obtained by culling the exclusion data from the original data row based on the cull condition are arranged in the predetermined order, data that are within a predetermined range whose center is a predetermined remarkable data in a predetermined display size on the display section.

Accordingly, only the extraction data which are left as a result of culling the exclusion data from all data are displayed in a predetermined display size such that the relative order of extraction data on the original data row is maintained.

According to an embodiment of the present invention, only the extraction data extracted from all data based on the extraction condition are displayed in a predetermined display size such that the relative order of extraction data on the original data row is maintained. Thus, the data display apparatus, the data display method and the data display program allow a user to easily recognize a plurality of data displayed.

In addition, according to an embodiment of the present invention, in response to the input operation, only the extraction data extracted from all data based on the extraction condition are displayed in a predetermined display size such that the relative order of extraction data on the original data row is maintained. Thus, the graphical user interface allows a user to easily recognize a plurality of data displayed.

Furthermore, according to an embodiment of the present invention, only the extraction data which are left as a result of culling the exclusion data from all data are displayed in a predetermined display size such that the relative order of extraction data on the original data row is maintained. Thus, the data display apparatus allows a user to easily recognize a plurality of data displayed.

The nature, principle and utility of the invention will become more apparent from the following detailed description when read in conjunction with the accompanying drawings in which like parts are designate by like reference numerals or characters.

BRIEF DESCRIPTION OF THE DRAWINGS

In the accompanying drawings:

FIGS. 4A and 4B are schematic diagrams illustrating the configuration of a data management table;

FIG. 13 is a schematic diagram showing the configuration of metadata;

FIG. 14 is a schematic diagram showing the configuration of priority data;

FIG. 15 is a schematic diagram showing the configuration of an all content row;

DETAILED DESCRIPTION OF PREFERRED EMBODIMENTS

An embodiment of the present invention will be described in detail with reference to the accompanying drawings.

(1) Overall Configuration of Audio Device

Figure 1:
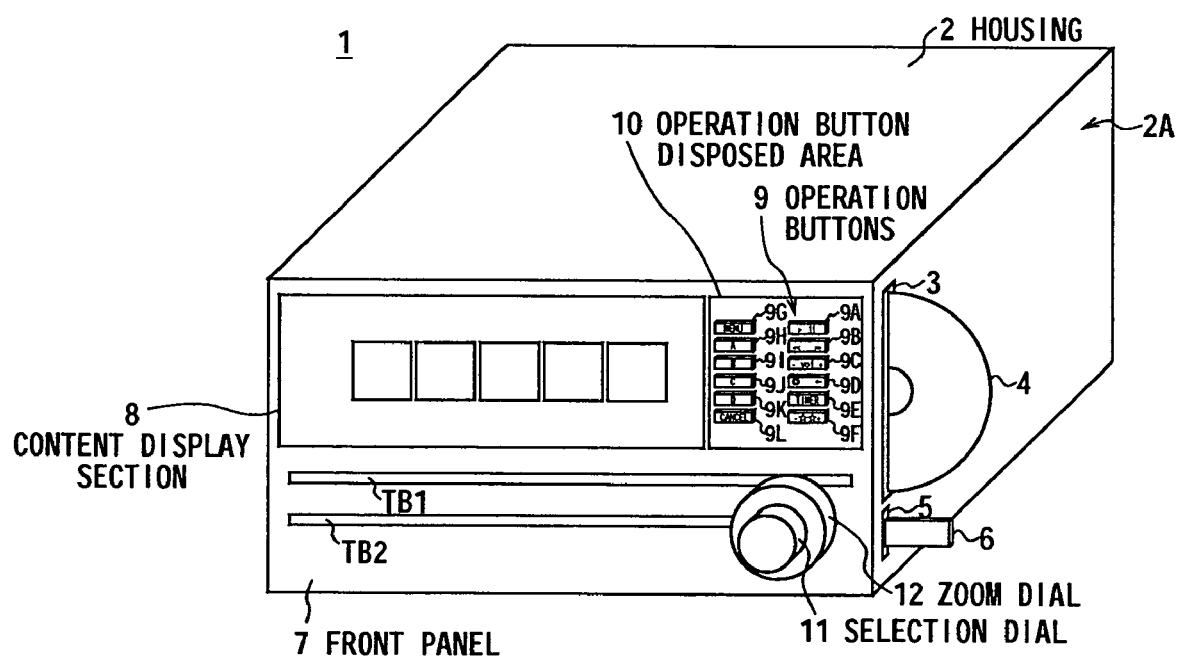
FIG. 1 is a schematic perspective view of an audio device.

In FIG. 1, the reference numeral 1 denotes an audio device according to an embodiment of the present invention. An insertion slot 3 is placed on a right side panel 2A of a housing 2. The insertion slot 3 accepts an optical disc 4 such as Digital Versatile Disc (DVD) and Compact Disc (CD). An entry slot 5 is placed below the insertion slot 3. The entry slot 5 accepts a small memory card 6 such as "MEMORY STICK (Registered Trademark of Sony Corporation)".

The audio device 1 also includes the following components: a content display section 8, such as liquid crystal display, on a front panel 7; an operation button disposed area 10 on the right of the content display section 8; and a zoom dial 12 with a selection dial 11 on the bottom right of the content display section 8 and the operation button disposed area 10. The zoom dial 12, which is larger than the selection dial 11, is placed under the selection dial 11 that is to be used to select music content.

In addition, the audio device 1 includes time axis bar display sections TB1 and TB2 (described below) to present pieces of music content in chronologic order, or in order of time. The time axis bar display sections TB1 and TB2 are for example equivalent to a liquid crystal display, being placed below the content display section 8 and the operation button disposed area 10.

The audio device 1 is capable of playing back the music content from the optical disc 4 in the insertion slot 3 and from the small memory card 6 in the entry slot 5 to output music through a speaker (not shown) connected to the audio device 1. In addition, the audio device 1 is capable of reading out the music content from the optical disc 4 and the small memory card 6 to store it in an internal hard disk drive.

Furthermore, the audio device 1 is capable of connecting to the Internet through a network cable. This allows the audio device 1 to download the desired music content from external servers on the Internet and then store it in the internal hard disk drive.

The operation button disposed area 10 includes a group of operation buttons 9: a playback button 9A, which is to be used to play back or stop the music data selected by the selection dial 11; a skip button 9B, which is used to skip the music content; a volume control button 9C; a recording button 9D; a timer setting button 9E; a user rating button 9F (described later); a menu button 9G, which is used to switch modes; optional buttons 9H to 9K, to which various functions may be assigned according to the modes; and a cancel button 9L. The audio device 1 performs various processes in accordance with the user's operation of the operation buttons 9.

(2) Circuit Configuration of Audio Device (2-1) Circuit Configuration

Figure 2:
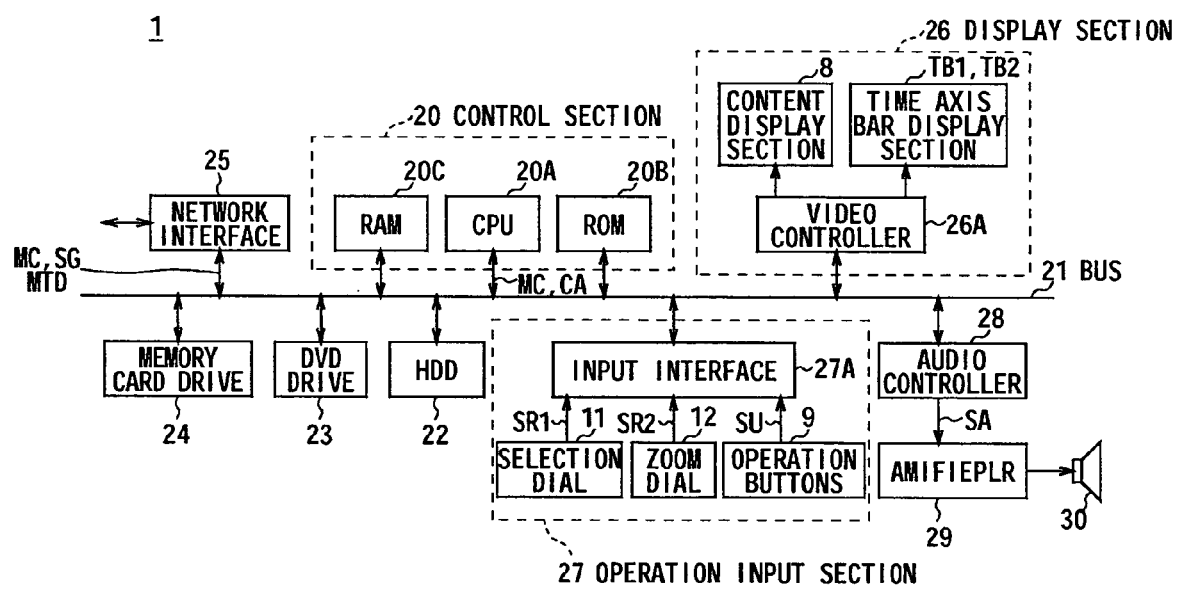
FIG. 2 is a schematic block diagram illustrating the circuit configuration of the audio device.

As shown in FIG. 2, a control section 20 takes overall control of the audio device 1. In the control section 20, a Central Processing Unit (CPU) 20A reads out programs, such as basic programs and content display programs, from a Read Only Memory (ROM) 20B through a bus 21, and then loads them onto a Random Access Memory (RAM) 20C to perform processes such as a content display process.

The control section 20 for example rips music data from the optical disc 4 (FIG. 1) that has been inserted into a DVD drive 23 through the insertion slot 3 (FIG. 1). The control section 20 then encodes the music data in the format of MPEG-1 Audio Layer 3 (MP3), Adaptive Transform Acoustic Coding 3 (ATRAC3) or the like to generate the music content MC. Alternatively, the control section 20 directly reads out the music content MC, which has been already encoded, from the small memory card 6 that has been inserted into a memory card drive 24 through the entry slot 5 (FIG. 1). The control section 20 stores the music content MC in a hard disk drive (HDD) 22.

The control section 20 also acquires the music content MC from an external content server (not shown) through a network interface 25, and then stores it in the hard disk drive 22.

In addition to that, the control section 20 acquires, from the external content server and other servers that are connected to the audio device 1 through the Internet, a thumbnail image SG including jacket photographs of the music content MC, and metadata MTD including music names, artist names, and release date of the music content MC. The control section 20 subsequently reduces the size of the thumbnail image SG in all directions, and then compresses the size of thumbnail image SG in horizontal direction to produce a content icon CA. The control section 20 then stores the content icon CA in the hard disk drive 22 such that it is associated with the music content MC.

By the way, the hard disk drive 22 has enough space to store, for example, thousands to tens of thousands of pieces of music content MC.

A video controller 26A of a display section 26 obtains a display command from the control section 20 via the bus 21. In response to the display command, the video controller 26A displays a plurality of thumbnail images SG of music content MC on the content display section 8 of the front panel 7. In addition, the video controller 26A displays a content icon CA on the time axis bar display sections TB1 and TB2, and also updates, in response to the display command, the displayed information.

When a user rotates the selection dial 11 to the right or left (this operation will be also referred to as "selection operation"), a rotary encoder (not shown) of an operation input section 27 in the selection dial 11 generates, in response to the rotated angle (the amount of rotation), a rotation signal SR1, and then supplies the rotation signal SR1 to the control section 20 through an input interface 27A and the bus 21.

In response to that, the control section 20 switches what it focuses to a right- or left-hand thumbnail image SG on the content display section 8. In this manner, the control section 20 changes the selection of the music content MC (described later in detail).

When a user rotates the zoom dial 12 to the right or left (this operation will be also referred to as "zoom change operation"), a rotary encoder (not shown) of the operation input section 27 in the zoom dial 12 generates, in response to the rotated angle, a rotation signal SR2, and then supplies the rotation signal SR2 to the control section 20 through the input interface 27A and the bus 21.

In response to that, the control section 20 changes an extraction condition that defines which thumbnail images SG the content display section 8 displays out of all the thumbnail images SG of the music content MC stored in the hard disk drive 22, and updates the thumbnail images SG on the content display section 8. The control section 20 also updates a display pattern of the content icons CA on the time axis bar display sections TB1 and TB2 (described later in detail).

When the operation buttons 9 are pushed, the operation input section 27 generates a push signal SU, and then supplies the push signal to the control section 20 through the input interface 27A and the bus 21. In this case, the control section 20 performs various processes in response to the operation button pushed (i.e. the playback button 9A to the cancel button 9L), such as playback process.

When the playback button 9A of the operation buttons 9 is pushed while any music content MC is not being played back, the control section 20 reads out the piece of music content MC, which is associated with the focused (or selected) thumbnail image SG, from the hard disk drive 22, and then supplies the piece of music content MC to the audio controller 28 via the bus 21.

The audio controller 28 receives the piece of music content MC, which was read from the hard disk drive 22, via the bus 21, and then performs processes in accordance with the encoding format of the music content MC, such as decoding and Digital-to-Analog (D/A) conversion, to produce a reproduced signal SA. The audio controller 28 subsequently amplifies the reproduced signal SA by an amplifier 29, and then supplies it to a speaker 30 which then outputs, based on the reproduced signal, sound.

In this manner, the audio device 1 displays the thumbnail image SG of the piece of music content MC stored in the hard disk drive 22 on the content display section 8 and the like, and also updates the information displayed on the content display section 8 and the like in response to the selection operation or zoom change operation of the operation input section 27 about the music content MC, and then plays back the selected piece of music content MC.

(2-2) Functional Configuration of Audio Device

Figure 3:
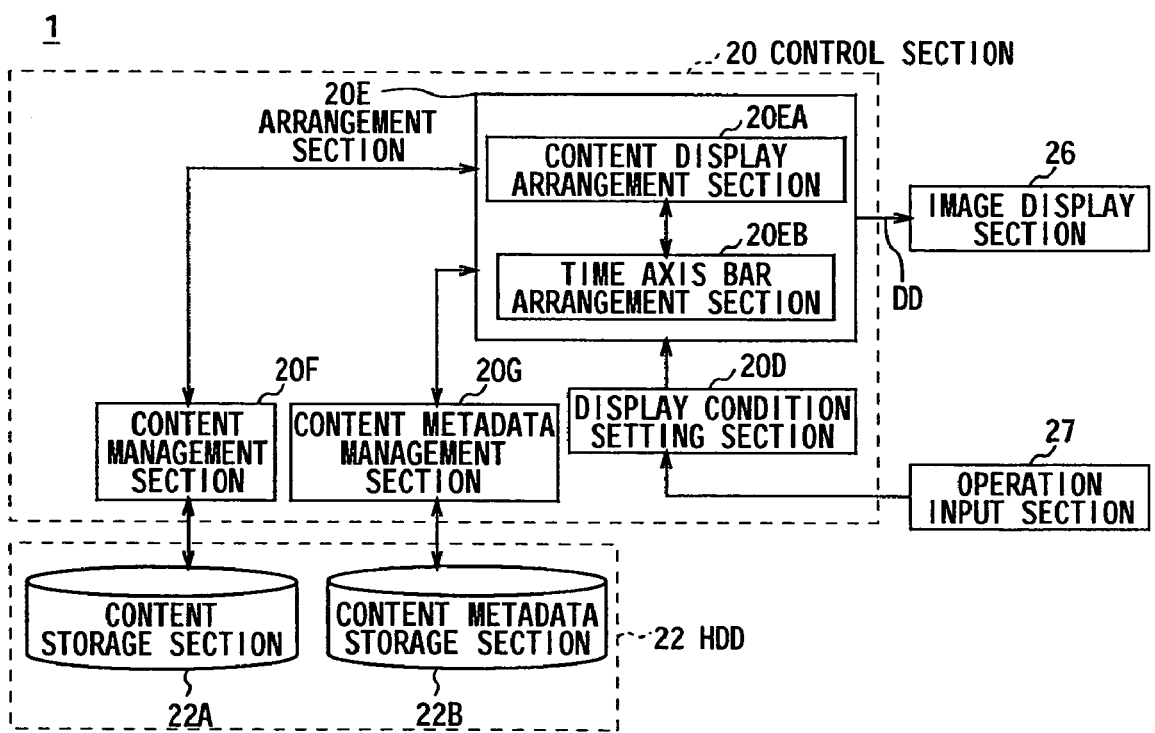
FIG. 3 is a schematic block diagram illustrating the functional configuration of the audio device.

FIG. 3 shows the functional configuration of the audio device 1, detailing the functions of displaying the thumbnail images SG.

The hard disk drive 22 stores the following data in a content storage section 22A: the pieces of music content MC, and the thumbnail images SG and content icons CA corresponding to the pieces of music content MC. The hard disk drive 22 also stores various metadata MTD, such as music names, artist names, release data and annual ranking of the pieces of music content MC, in a content metadata storage section 22B.

The hard disk drive 22 uses a content data management table TBL1 (FIG. 4A) to manage the pieces of music content MC, which are stored in the content storage section 22A, their thumbnail images SG and content icons CA as a file with a predetermined content name indicated by a content ID. FIG. 4B shows a content metadata management table TBL2 that manages various metadata MTD, which are stored in the content metadata storage section 22B, as a file with a content metadata name indicated by a content ID.

A display condition setting section 20D of the control section 20 sets, in accordance with the selection operation of the selection dial 11 of the operation input section 27 or the zoom change operation of the zoom dial 12 of the operation input section 27, the display condition that defines which thumbnail images SG the content display section 8 displays and which content icons CA the time axis bar display sections TB1 and TB2 display, and then supplies the display condition to an arrangement section 20E.

The arrangement section 20E of the control section 20 obtains the display condition from the display condition setting section 20D, and then acquires the thumbnail image SG of each piece of music content MC that matches the display condition from the content storage section 22A of the hard disk drive 22 through a content management section 20F. The arrangement section 20E also acquires the metadata MTD of each piece of music content MC that matches the display condition from the content metadata storage section 22B of the hard disk drive 22 through a content metadata management section 20G.

The arrangement section 20E selects, based on the metadata MTD and thumbnail image SG of each piece of music content MC, the thumbnail images SG to be displayed on the content display section 8 and arranges them by a content display arrangement section EA. A time axis bar arrangement section 20E generates display image data DD by arranging the content icons CA to be displayed on the time axis bar display sections TB1 and TB2. The arrangement section 20E supplies the display image data DD to the display section 26.

Based on the display image data DD, the display 26 displays a display image: the thumbnail images SG are placed on the content display section 8 and the content icons CA are placed on the time axis bar display sections TB1 and TB2.

(3) Configuration of Front Panel

The audio device 1 according to an embodiment of the present invention has enough space to store thousands to tens of thousands of pieces of music content MC in its internal hard disk drive 22. The front panel 7 is designed to allow a user to easily retrieve his/her desired piece of music content MC from many pieces of music content MC without using music or artist names.

(3-1) All Music Display Mode

Figure 5:
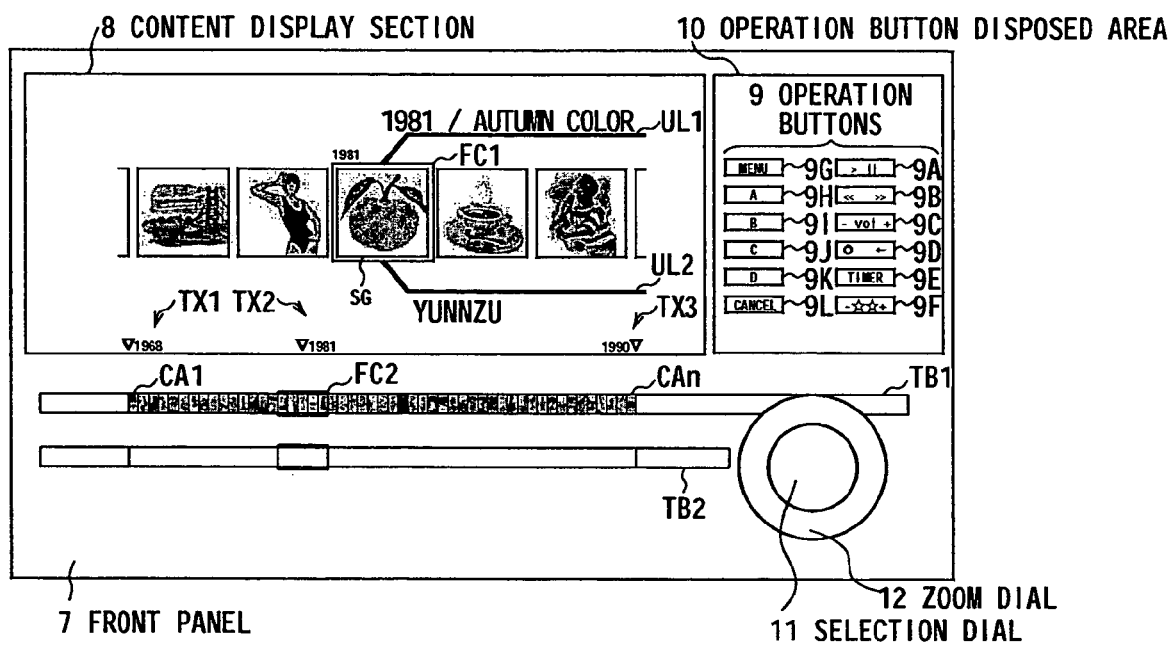
FIG. 5 is a schematic diagram illustrating the information displayed on a front panel in all music display mode.

As shown in FIG. 5, the front panel 7 of the audio device 1 includes the following components: the content display section 8, which displays a plurality of pieces of thumbnail images SG (5 pieces, in this case) each of which includes a jacket photograph and the like of the music content; the time axis bar display section TB1, where the content icons CA1 to CAn corresponding to all pieces of music content MC stored in the hard disk drive 22 are displayed side by side in order of release date (year, month and day of release); and the time axis bar display section TB2, where the content icons CA of the pieces of music content MC that have been culled in a predetermined manner at the time of content retrieval as low-priority data are displayed side by side in order of release date (year, month and day of release).

An all music display mode displays all the content icons CA1 to CAn on the time axis bar display section TB1 in order of release date (year, month and day of release), and does not display any content icons CA on the time axis bar display section TB2.

If the user selects one piece of music content MC by the selection dial 11, then this piece of music content MC is focused by the content display section 8. The content display section 8 visually notifies the user of the fact that the piece of music content MC has been focused by putting a red focus frame FC1 on the thumbnail image SG of this piece of music content MC. In addition, the content display section 8 displays its release year and music name ("1981/Autumn color", in this case) on an red underline UL1 extending upward from the focus frame FC1, and its artist name ("YUNNZU", in this case) under an red underline UL2 extending downward from the focus frame FC1.

In this manner, the audio device 1 allows the user to easily recognize the piece of music content MC, which is currently selected by the selection dial 11 through the focus frame FC1 of the content display section 8, by checking the thumbnail image SG, the characters on the underline UL1 and the characters under the underline UL2.

Especially, the audio device 1 can present the piece of music content MC as an image of the thumbnail image SG. Therefore the user who does not remember anything like its music and artist names but its image can easily determine whether this piece of music content is what he/she wants to retrieve. In addition, that reminds him/her that this piece of music content MC is there. Accordingly, this piece of music content MC can be included in his/her retrieval target.

The time axis bar display section TB1 on all music display mode displays the content icons CA1 to CAn in order of release date (year, month and day), or in order of time. In accordance with that, the content display section 8 displays the character strings TX1 to TX3 indicative of the release date of the content icon CA1 to CAn (1968, 1981, and 1990, in this case) on the bottom area of the content display section 8.

In addition, the time axis bar display section TB1 surrounds the five content icons CA, which correspond to the five thumbnail images SG on the content display section 8, with a red focus frame FC2 for example. This allows the user to visually understand, through the focus frame FC2 and the character strings TX1 to TX3 on the content display section 8, where the piece of music content MC selected by the focus frame FC1 is located on the time line.

Figure 6:
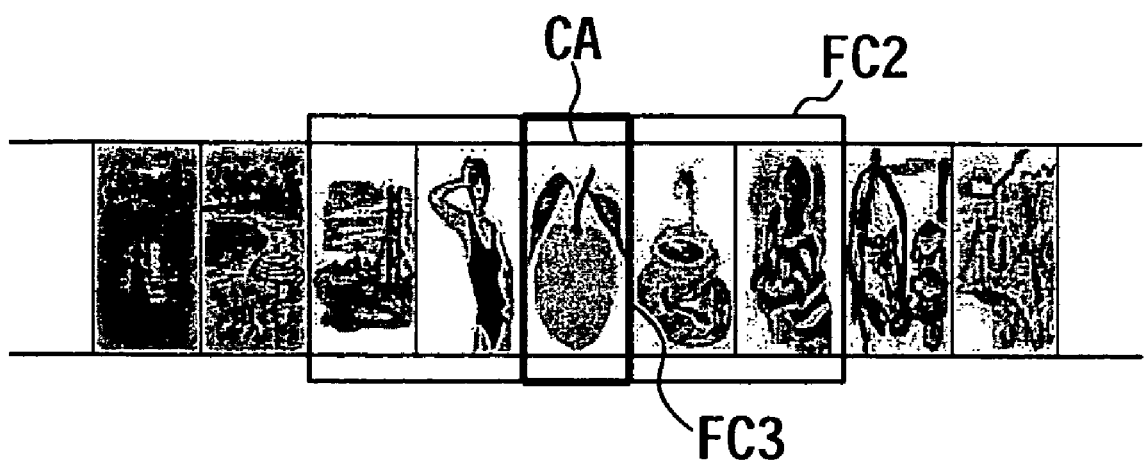
FIG. 6 is a schematic diagram illustrating the configuration of a focus frame.

Especially, as shown in FIG. 6, the time axis bar display section TB1 surrounds the five content icons CA, which correspond to the five thumbnail images SG currently displayed on the content display section 8, with the focus frame FC2. Inside this, the time axis bar display section TB1 furthermore surrounds the content icon CA, which corresponds to the thumbnail image SG that is currently selected by the focus frame FC1 (FIG. 5), with the red focus frame FC3 and also puts yellow on the whole content icon CA to be displayed.

In this manner, the audio device 1 associates the five thumbnail images SG on the content display section 8 with the five content icons CA inside the focus frame FC2 of the time axis bar display section TB1. Accordingly, the user can easily and intuitively understand which generation the pieces of music content MC corresponding to the five thumbnail images SG belong to on the time axis bar display section TB1.

In addition, the audio device 1 plays back, after the thumbnail image SG is selected by the focus frame FC1, the piece of music content MC of the thumbnail image SG. This allows the user to listen to the sound of the piece of music content MC.

In this manner, the audio device 1 allows the user to check the thumbnail image SG of the piece of music content MC, its release date, and its actual sound to retrieve the piece of music content MC. Accordingly, even if the user does not remember the music name and artist name, he/she can retrieve his/her desired piece of music content MC.

(3-2) Selection and Display of Music Content

Figure 7:
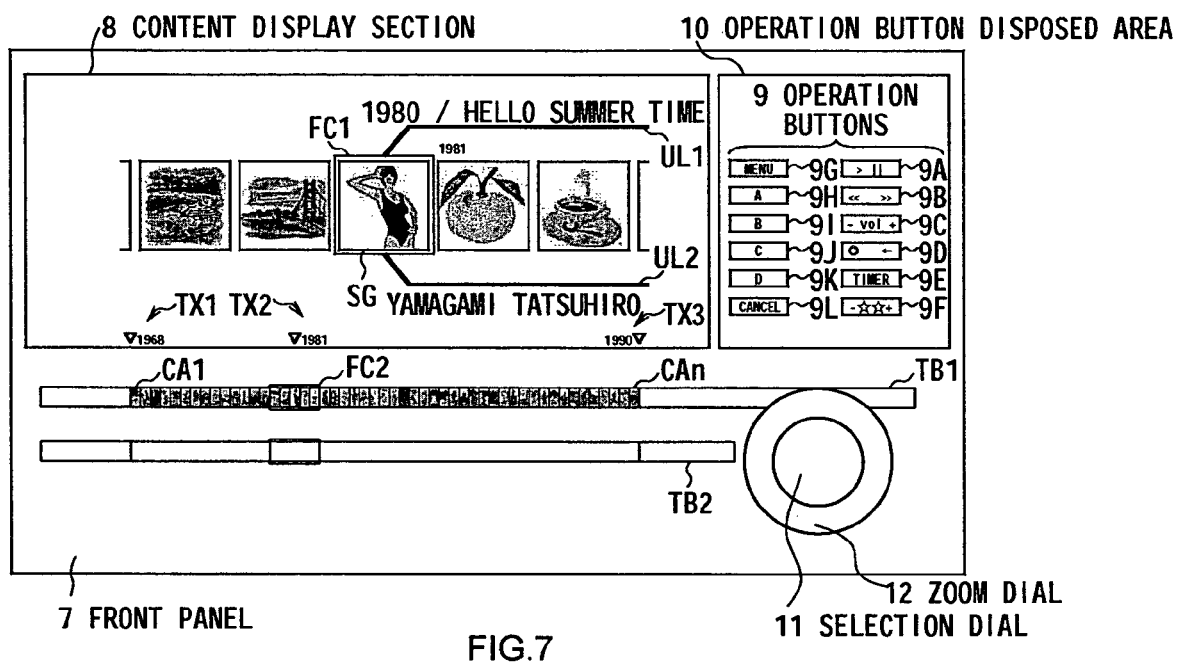
FIG. 7 is a schematic diagram illustrating methods of selecting and displaying the pieces of music content.

As shown in FIG. 7, the control section 20 of the audio device 1 moves the thumbnail images SG on the content display section 8 by one frame each time the selection dial 11 is rotated at its minimum angular increment by the user.

In response to that, the control section 20 of the audio device 1 moves the focus frame FC of the content display section 8 to the next-frame thumbnail image SG. In addition, the control section 20 of the audio device 1 moves the focus frame FC2, which surrounds five of the content icons CA, by one frame.

At this time, the control section 20 of the audio device 1 displays the release date and music name of the piece of music content MC corresponding to the thumbnail image SG selected by the focus frame FC1 ("1980/Hello Summer Time", in this case) on the underline UL1, and its artist name ("YAMAGAMI TATSUHIRO", in this case) under the underline UL2.

When the different thumbnail image SG is selected by the focus frame FC1, the control section 20 of the audio device 1 starts to play back the piece of music content MC of this thumbnail image SG, and this allows the user to listen to the sound of this piece of music content MC.

Accordingly, each time the focus frame FC1 focuses the different thumbnail image SG, the control section 20 of the audio device 1 outputs the sound of the piece of music content MC corresponding to this thumbnail image SG selected by the focus frame FC1. In this manner, outputting the sound of the piece of music content MC helps the user to retrieve his/her desired piece of music content MC.

In addition, the control section 20 of the audio device 1 on all music display mode sequentially moves, in response to the dial operation of the selection dial 11, the thumbnail images SG on the content display section 8. However, the gap between the release date of the piece of music content MC of the thumbnail image SG and that of the piece of music content MC of the adjacent thumbnail image SG may be just one day, or sometimes one year. It is difficult to recognize how much each dial operation makes the release date go forward or backward. One way to address this point is the method of zoom change display described later.

(3-3) Zoom Change Display

Figure 8:
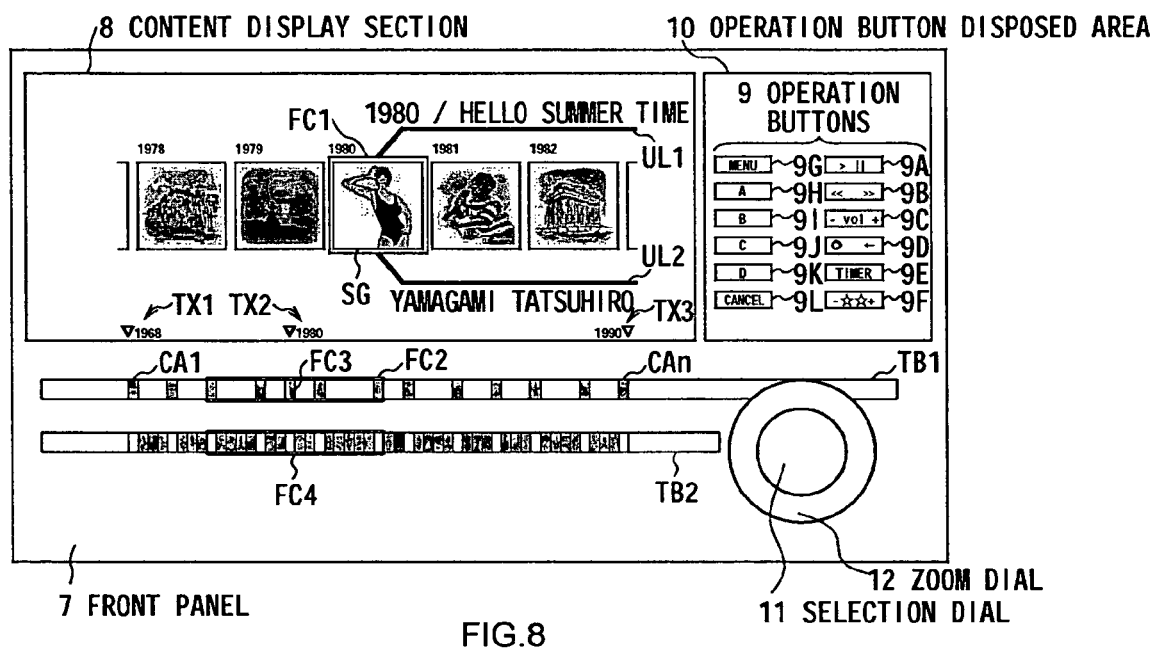
FIG. 8 is a schematic diagram illustrating methods of zoom change display.

When the zoom dial 12 is rotated through a certain angle to the right by the user after the thumbnail image SG (FIG. 7) on the content display section 8 is selected by the focus frame FC1, the control section 20 of the audio device 1 extracts, based on the metadata MTD read from the content metadata storage section 22B of the hard disk drive 22, the number one pieces of music content MC on the each annual ranking list, as shown in FIG. 8. The control section 20 subsequently reads out the thumbnail images SG of these pieces of music content MC from the content storage section 22A, and displays them on the content display section 8 as an extraction result of zooming out them out of all the thumbnail images SG.

At the same time, the control section 20 leaves only the content icons CA corresponding to the number one pieces of music content MC on the time axis bar display section TB1, and moves the rest of the content icons CA to the time axis bar display section TB2.

That is to say, the control section 20 displays, on the content display section 8, the release date of each piece of music content MC on the top left side of the corresponding thumbnail image SG. In this manner, the control section 20 presents a plurality of pieces of number one music content MC each year based on the annual ranking as signature piece for the year. Among them, the thumbnail image SG surrounded by the focus frame FC1 is displayed along with the underline UL1 on which the release year and music name ("1980/Hello Summer Time", in this case) are displayed, and the underline UL2 below which the artist name ("YAMAGAMI TATSUHIRO", in this case) is displayed.

In this case, the piece of music data MC corresponding to the thumbnail image SG surrounded by the focus frame FC1 is that year's representative work. However, as for the piece of music content MC corresponding to the thumbnail image SG selected by the focus frame FC1 before the zoom change operation is performed, regardless of whether it is annual number one or not, the content display section 8 continues to display this thumbnail image SG even after the zoom change operation.

It is because the default setting of the audio device 1 is to display the piece of music content MC selected by the focus frame FC1 prior to others. Accordingly, when the selection operation of the selection dial 11 moves the focus frame FC to select the different thumbnail image SG, the control section 20 of the audio device 1 zooms out the screen and then moves the focus frame FC1 such that it surrounds the adjoining thumbnail image SG on the right or left side of it.

In addition, in a case in which the content display section 8 displays the thumbnail images SG of the number one pieces of music content MC based on the annual ranking, the control section 20 of the audio device 1 leaves the content icons CA, which correspond to the number one pieces of music content MC on the annual ranking, on the time axis bar display section TB1 in order of date. The control section 20 picks up (or culls) the content icons CA corresponding to the second and subsequent place pieces of music content MC from the time axis bar display section TB1, and then displays them on the time axis bar display section TB2 in order of date.

The control section 20 of the audio device 1 allows the user to visually check the arrangement state of the five content icons CA surrounded by the focus frame FC2 of the time axis bar display section TB1, and the content icon CA selected by the focus frame FC3. Accordingly, the user can recognize which period of time the representative piece of music content MC, which is on the zoomed out screen on the content display section 8, belongs to on the time axis bar display section TB1. In addition, by seeing the blank spaces between the content icons CA, the user can visually and intuitively understand that many pieces of music content MC have been culled because they are not representative each year.

That is to say, the control section 20 of the audio device 1 allows the user to visually check the arrangement state of the content icons CA on the time axis bar display sections TB1 and TB2 through the focus frames FC2 and FC4. Accordingly, the user can intuitively recognize how the pieces of music content MC extracted by the zoom change operation are distributed on the time line, and how the pieces of music content MC culled (those not extracted by the zoom change operation) are distributed on the time line.

In this manner, in the audio device 1, the user's dial operation of the zoom dial 12 picks up the number one pieces of music content MC based on the annual ranking, and then only displays those thumbnail images SG on the content display section 8 such that they are zoomed out. Because the audio device 1 presents only representative pieces of the music content MC, the user can easily find out his/her desired piece of music content MC.

Especially, the audio device 1 only displays the thumbnail images SG corresponding to each year's representative piece of music content MC on the content display section 8. When the user's dial operation of the selection dial 11 moves the focus frame FC1 to select the adjoining thumbnail image SG, the thumbnail image SG of the previous or next year's representative piece of music content MC will be displayed. This improves the operationality, relative to the all music display mode, in a case in which the user retrieves the each year's representative piece by the selection dial 11.

In addition, the thumbnail images SG of each year's representative piece of music content MC helps the user to retrieve an unknown piece of music content MC, one whose music name and artist name are not know to him/her.

In addition, the audio device 1 does not change the size of the thumbnail images SG and the distance between the thumbnail images SG even after and before they are zoomed out. This provides easy-to-see images, and the user may be able to retrieve his/her desired piece of music content MC without any feeling of strangeness.

(3-4) Selection and Display of Music Content after Zoom-Out Display

Figure 9:
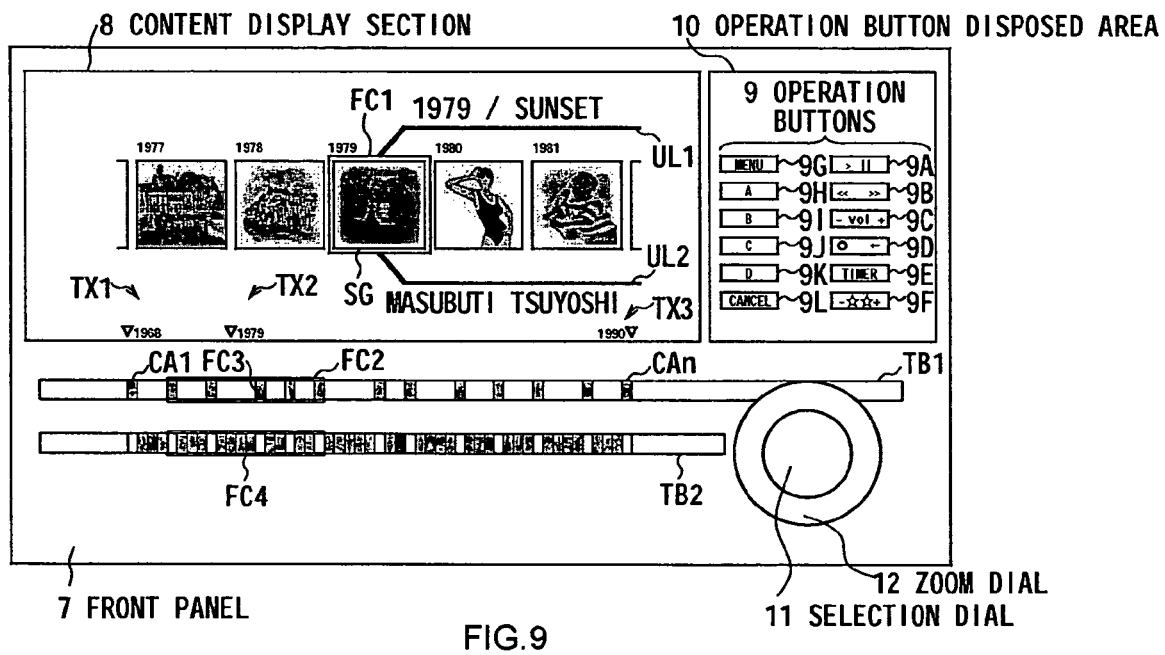
FIG. 9 is a schematic diagram illustrating methods of selecting and displaying the pieces of music content after zoom out display.

As shown in FIG. 9, the control section 20 of the audio device 1 only displays the thumbnail images SG of each year's number one piece of music content MC on the content display section 8 such that they are zoomed out. When the selection dial 11 is rotated at its minimum angular increment by the user to move the line of thumbnail images SG on the content display section 8 by one frame, the focus frame FC1 then surrounds the adjoining thumbnail image SG.

At this time, under the control of the control section 20, the focus frame FC2 of the time axis bar display section TB1 surrounding five of the content icons CA moves by one frame. In addition, the focus frame FC4 of the time axis bar display section TB2 surrounding several of the content icons CA moves by several frames in accordance with the focus frame FC2.

In this manner, the audio device 1 associates the five thumbnail images SG zoomed out on the content display section 8 with the five content icons CA surrounded by the focus frame FC2 of the time axis bar display section TB1. Accordingly, the user can easily and intuitively understand which period of time the representative pieces of music content MC corresponding to the five thumbnail images SG belong to on the time axis bar display section TB1.

In addition, the control section 20 of the audio device 1 displays the release data and music name of the piece of music content MC corresponding to the thumbnail image SG selected by the focus frame FC1 ("1979/Sunset" in this case) on the underline UL1, and its artist name ("MIZOBUTI TSUYOSHI", in this case) under the underline UL2.

In addition, the control section 20 of the audio device 1 starts to play back, after the focus frame FC1 selects the different thumbnail image SG, the piece of music content MC corresponding to this thumbnail image SG.

Accordingly, when the user rotates the selection dial 11 to select the different thumbnail image SG by the focus frame FC1, the control section 20 of the audio device 1 outputs the sound of the piece of music content MC corresponding to the thumbnail image SG selected by the focus frame FC1. This means that, while retrieving his/her desired piece of music content MC from a bunch of representative pieces of music, the user listens to the sound of the piece of music content MC.

(3-5) Zoom-In Display

Figure 10:
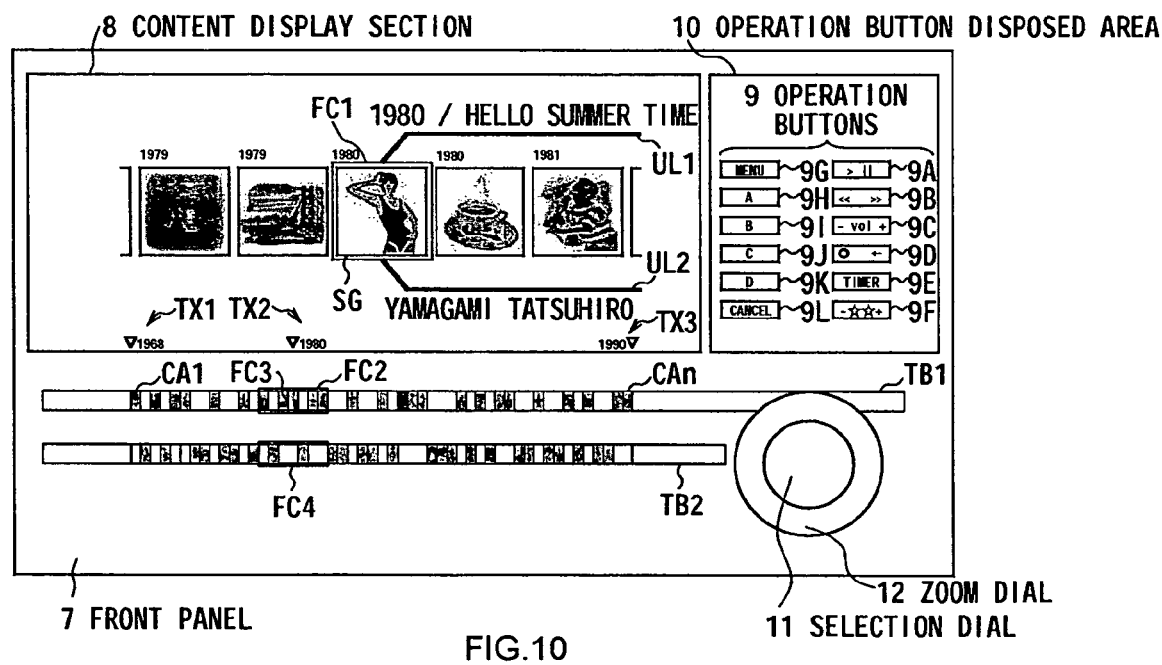
FIG. 10 is a schematic diagram illustrating methods of zoom in display.

The control section 20 of the audio device 1 for example only displays the thumbnail images SG (FIG. 9) corresponding to the each year's representative pieces of music content MC on the content display section 8, and, when the zoom dial 12 is rotated at its minimum angular increment by the user to the left, extracts the each year's second place pieces of music content MC based on the annual ranking of the metadata MTD read from the content metadata storage section 22B of the hard disk drive 22 as well as the each year's number one pieces of music content MC as shown in FIG. 10. The control section 20 then displays the thumbnail images SG of the number one and two pieces of music content MC on the content display section 8.

Accordingly, the control section 20 of the audio device 1 displays the thumbnail images SG of the number one and two pieces of music content MC on the each year's ranking on the content display section 8. Compared to the case in which only the each year's number one pieces of music content MC are zoomed out (previous pages), they seem to be slightly zoomed in to the user.

At the same time, the control section 20 of the audio device 1 leaves, by the focus frame FC2, only the content icons CA corresponding to each year's first and second place pieces of music content MC on the time axis bar display section TB1. Other content icons CA, which have been culled from the time axis bar display section TB1, are displayed on the time axis bar display section TB2.

In this manner, the control section 20 of the audio device 1 for example only displays the thumbnail images SG of each year's representative pieces of music on the content display section 8, and, each time the zoom dial 12 is rotated through a certain angle to the left by the user, zooms in the screen little by little, which then finally leads to the all music display mode (FIG. 5).

Accordingly, the control section 20 of the audio device 1 displays the thumbnail images SG corresponding to the first place pieces of the music content MC on the each year's ranking on the content display section 8, and, when the user rotates the zoom dial 12 to the left, zooms in the screen to display the thumbnail images SG of other pieces of music content MC which were also popular in the same period as the representative pieces of music. In this manner, the user can change the number of pieces of music he/she retrieves from, and therefore he/she can find out his/her desired pieces of music content MC easily.

(3-6) Selection and Display: Classification by Artist

After the focus frame FC1 of the content display section 8 selects a certain thumbnail image SG (FIGS. 7, 8 and 10, for example), if the user pushes the menu button 9G and selects an item of "artist" on a pop-up menu (not shown), the control section 20 of the audio device 1 reads out all the artist names of the metadata MTD about all the pieces of music content MC and then extracts only the pieces of music content MC whose artist are the same as the one selected by the focus frame FC1. The control section 20 then only reads out the thumbnail images SG of the extracted pieces of music content MC from the content storage section 22A to be displayed on the content display section 8.

Figure 11:
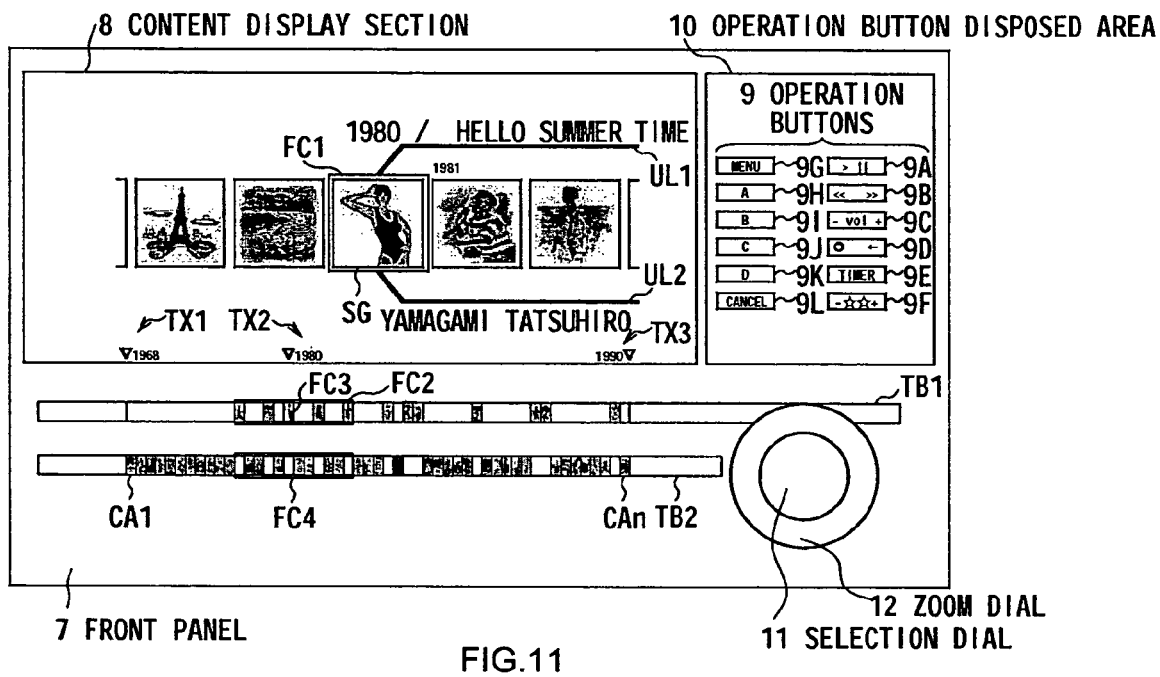
FIG. 11 is a schematic diagram illustrating methods of artist classification selection display.

Accordingly, as shown in FIG. 11, the control section 20 of the audio device 1 only displays, on the content display section 8, the thumbnail images SG corresponding to the plurality of pieces of music content MC released from a certain artist. If the user specifies an artist name, he/she can retrieve his/her desired piece of music content MC from among them.

In this case, if there are more than five pieces of music content MC of the artist, the control section 20 of the audio device 1 sequentially displays and scrolls the thumbnail images SG, which had not been displayed, on the content display section 8 in response to the user's dial operation of the selection dial 11.

In addition, the control section 20 surrounds, by the focus frame FC2 of the time axis bar display section TB1, an area in which there are five content icons CA corresponding to five thumbnail images SG displayed on the content display section 8. This allows the user to intuitively recognize that how the pieces of music content MC corresponding to the thumbnail images SG on the content display section 8 are distributed on the time line.

By the way, in this case, the content icons CA of the pieces of music content MC of other artists are those surrounded by the focus frame FC4 of the time axis bar display section TB2. Accordingly, in order for the user to retrieve the other artists' pieces of music content MC that were released at the same time as that of a certain artist, the control section 20 of the audio device 1 allows him/her to rotate the zoom dial 12 to the left to zoom in the screen.

(4) Procedure of Association Display Process

Figure 12:
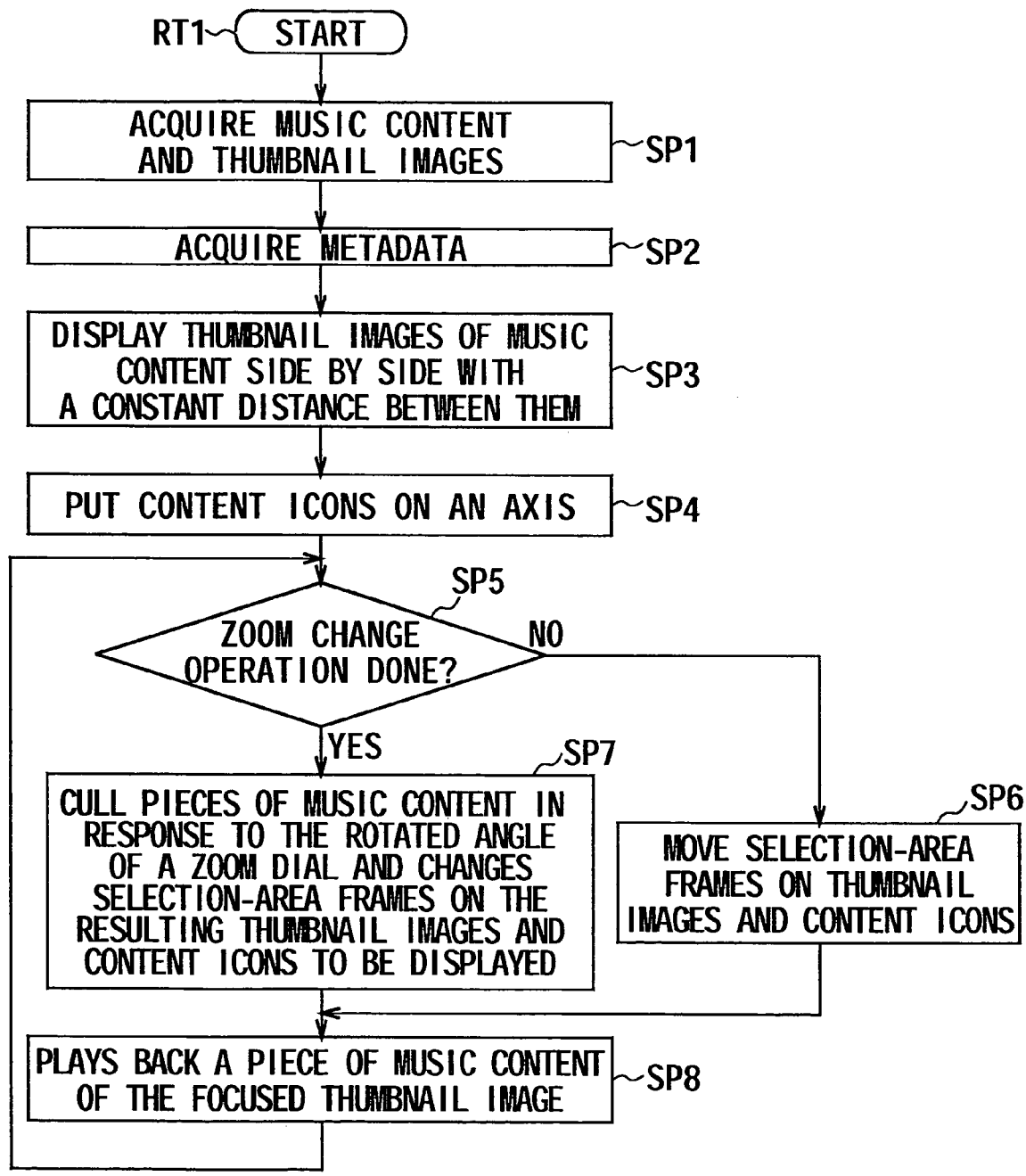
FIG. 12 is a flowchart illustrating a procedure of an association display process about thumbnail images and content icons.

A procedure of association display process will be described with reference to a flowchart in FIG. 12. The association display process allows the thumbnail images SG, which are displayed on the content display section 8 of the front panel 7, and the content icons CA, which are displayed on the time axis bar display sections TB1 and TB2, to cooperate with one another while being displaying.

The control section 20 of the audio device 1 starts a routine RT1 from its start step and then proceeds to step SP1. At step SP1, the control section 20 reads out all the thumbnail images SG of music content MC, which may be displayed on the content display section 8, from the content storage section 22A of the hard disk drive 22, and keeps them on the RAM 20C, and then proceeds to next step SP2.

At step SP2, the control section 20 reads out, from the content metadata storage section 22B, the metadata MTD corresponding to the pieces of music content MC whose thumbnail images SG were read out from the content storage section 22A of the hard disk drive 22, and keep them on the RAM 20C, and then proceeds to next step SP3.

At step SP3, the control section 20 makes the thumbnail images SG, which have been kept on the RAM 20C (step SP1), a predetermined size, and places them side by side at certain intervals, and displays five thumbnail images SG out of them on the content display section 8, and then proceeds to step SP4.

At step SP4, the control section 20 reads out the content icons CA corresponding to all the pieces of music content MC from the content storage section 22A of the hard disk drive 22, and places them on the time axis bar display section TB1 in order of release data (i.e. in order of time), and then proceeds to next step SP5.

At step SP5, the control section 20 checks whether the user has performed the zoom change operation of the zoom dial 12. If the negative result is obtained, this means that, instead of the zoom change operation of the zoom dial 12, the selection operation of the selection dial 11 has been performed. In this case, the control section 20 proceeds to step SP6. If the affirmative result is obtained, the control section 20 proceeds to step SP7.

At step SP6, in response to the user's dial operation of the selection dial 11, the control section 20 changes the thumbnail image SG selected by the focus frame FC1 by moving the thumbnail images SG on the content display section 8 by one frame of the thumbnail image SG. In accordance with that, the control section 20 moves the focus frame FC2 of the time axis bar display section TB1 by one piece of the content icon CA to associate a moving process of the thumbnail images SG (which is performed based on the selection operation of the selection dial 11) with a moving process of the focus frame FC2, and then proceeds to next step SP8.

At step SP7, the control section 20 sequentially culls, in response to the rotated angle of the zoom dial 12, the low-priority pieces of music content MC to extract the pieces of music content MC. The control section 20 then displays only the thumbnail images SG corresponding to the extracted pieces of music content MC on the content display section 8. The control section 20 also changes the selection area of the focus frame FC2 on the time axis bar display section TB1, and the selection area of the focus frame FC4 on the time axis bar display section TB2 to associate the zoom change display process of the thumbnail images SG (which is performed based on the zoom change operation of the zoom dial 12) with the selection area change process of the focus frames FC2 and FC4, and then proceeds to next step SP8.

At step SP8, the control section 8 plays back and outputs the piece of music content MC corresponding to the thumbnail image SG which is selected by the focus frame FC1 after the moving process of the thumbnail images SG (step SP6) and the zoom change display process of the thumbnail images SG (step SP7) are performed, and then returns to step SP5 to repeat subsequent processes.

In this manner, the control section 20 of the audio device 1 performs, in response to the user's dial operation of the selection dial 11 and zoom dial 12, the moving process of the thumbnail images SG on the content display section 8 and the zoom change display process. In accordance with that, the control section 20 also performs the selection area change process of the focus frames FC2 and FC4 on the time axis bar display sections TB1 and TB2.

(5) Cull and Display (5-1) Calculation of Priority

By the way, as mentioned above, in a case in which the audio device 1 performs the zoom change display, the audio device 1 only displays, on the content display section 8, the thumbnail images SG of a part of pieces of music content MC out of all the pieces of music content MC. Therefore, the audio device 1 may need to extract some of the thumbnail images SG to be displayed.

To do that, the audio device 1 calculates priority evaluation values PV based on the metadata MTD stored along with each piece of music content, and then, based on the priority evaluation values PV, extracts the thumbnail images SG to be displayed on the content display section 8.

Actually, as shown in FIG. 13, besides attribute data of music content MC such as music names, artist names and release date, the audio device 1 stores other kind of data in the content metadata storage section 22B of the hard disk drive 22 as metadata MTD: popularity rating data like the total sales numbers AS, the annual ranking Ry, the monthly ranking Rm and the weekly ranking Rw, and preference rating data like user rating UR with 9 ratings input by the users.

By the way, in the annual ranking, each piece of music content MC is ranked within first to 100th. In the monthly and weekly rankings, each piece of music content MC is ranked within first to 10th. In the user rating UR, each piece of music content MC is ranked with 9 ratings: the lowest rank is "−3," and the highest rank is "+5". The user rating UR is adjustable, in accordance with user's preference, by pushing the user rating button 9F (FIG. 2).

Based on the following formulas (1a) to (1d), the audio device 1 calculates a user weighting Wu, an annual rank weighting Wy, a monthly weighting Wm and a weekly rank weighting Ww using the popularity rating data and the preference rating data.

$$Wu = UR + 4 \tag{1a}$$

$$Wy = \text{(the total numbers of annual ranking)} - Ry \tag{1b}$$

$$Wm = \text{(the total numbers of monthly ranking)} - Rm \tag{1c}$$

$$Ww = \text{(the total numbers of weekly ranking)} - Rw \tag{1d}$$

In addition, in accordance with the following formula (2), the audio device 1 calculates the priority evaluation value PV by multiplying the user weighting Wu, the annual rank weighting Wy, the monthly weighting Wm and the weekly rank weighting Ww by predetermined coefficients Fu, Fy, Fm and Fw and adding the total sales numbers AS to them. In this case, the priority evaluation value PV is greater than zero.

$$PV = Fu \times Wu + Fy \times Wy + Fm \times Wm + Fw \times Ww + AS \tag{2}$$

The relationship between the coefficients Fu, Fy, Fm and Fw is as follows:

$$Fu>Fy>Fm>Fw \quad (3)$$

Accordingly, this means that, as for the priority evaluation value PV, the user weighting Wu, the annual rank weighting Wy, the monthly weighting Wm and the weekly rank weighting Ww are sifted against the total sales numbers AS. FIG. 14 shows the configuration of the resulting data.

When the audio device 1 acquires a new piece of music content MC from the optical disc 4 or the small memory card 6 (FIG. 1) and stores it in the content storage section 22A of the hard disk drive 22, the audio device 1 calculates its priority evaluation value PV and then stores it in the content metadata storage section 22B as metadata MTD.

(5-2) Cull and Display of Thumbnail Images

For instance, as shown in FIG. 15, assume that all the pieces of music content MC are pieces of content A to content Z. The control section 20 of the audio device 1 recognizes the pieces of content A to Z in order of release date (the row of pieces of content A to Z in order of release date is also referred to as an "all content row LC0"). The control section 20 extracts the user's desired pieces of music content MC by culling the pieces of music content MC with the low priority evaluation values PV from the all content row LC0. The control section 20 only displays five thumbnail images SG corresponding to the extracted pieces of music content MC on the content display section 8.

The control section 20 of the audio device 1 can be set to one of the following five modes: an "all display level LV1" where the thumbnail images SG corresponding to all the pieces of music content MC are displayed with the all display mode (FIG. 5); a "weekly display level LV2" where the thumbnail image SG of the piece of music content MC ranked number one at the weekly ranking is displayed; a "monthly display level LV3" where the thumbnail image SG of the piece of music content MC ranked number one at the monthly ranking is displayed; an "annual display level LV4" where the thumbnail image SG of the piece of music content MC ranked number one at the annual ranking is displayed; and a "highest evaluation display level LV5" where the thumbnail image SG of the piece of music content MC with the highest evaluation ("+5") of the user rating UR is displayed.

In this case, besides those five display levels LV, there might be a display level LV, where the thumbnail images SG of the pieces of music content MC ranked number one and two at the annual ranking are displayed. However, for ease of explanation, the description about it will be omitted.

The control section 20 sets the threshold values TH about the priority evaluation values PV: five threshold values TH1 to TH5 each of which corresponds to one of the "all display level LV1" to "highest evaluation display level LV5".

In fact, when the control section 20 receives a rotation signal SR2 (which is based on the rotated angle of the zoom dial 12) as a result of the zoom change operation of the zoom dial 12, the control section 20 selects, in response to the rotation signal SR2, one of the threshold values TH1 to TH5 (the selected one will be referred to as an "extracted threshold value THA").

The control section 20 subsequently culls, out of all pieces of music content MC, the pieces of music content MC (also referred to as "culled music content MCZ (or exclusion music content MCZ)") whose priority evaluation values PV are less than the extracted threshold value THA to extract the pieces of music content MC (also referred to as "extracted music content MCA") whose priority evaluation values PV are greater or equal to the extracted threshold value THA. At this time, the control section 20 displays, on the content display section 8, five thumbnail images corresponding to the five pieces of extracted music content MCA such that the pieces of music content MC (also referred to as "selected music content MCS") selected by the focus frame FC1 of the content display section 8 are centered on. In this manner the control section 20 switches the display level in response to the zoom change operation to perform the zoom change display.

By the way, the control section 20 has set the threshold value TH1 to zero. Accordingly, the control section 20 at the "all display level LV1" extracts all pieces of music content MC as extracted music content MCA because the priority evaluation values PV of all the pieces of music content MC are greater than the extracted threshold value THA, or the threshold value TH1.

Figure 16A:
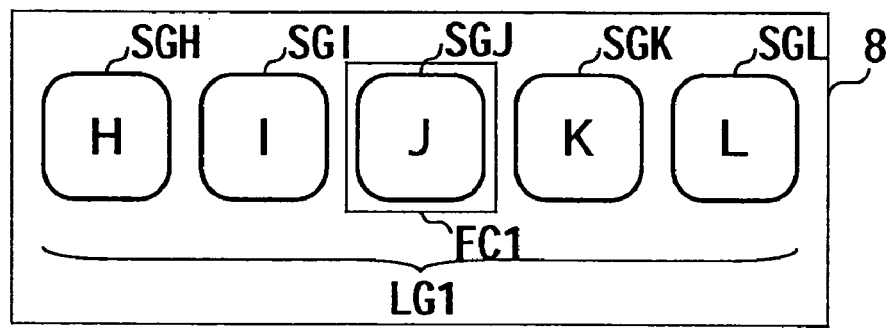
FIGS. 16A and 16B are schematic diagrams illustrating methods of displaying thumbnail images and cull marks.

If the piece of content J in the all content row LC0 is selected by the focus frame FC1 as the selected music content MCS and the control section 20 is being set to the all display level LV1, the control section 20 displays, on the content display section 8, the five thumbnail images SGH to SGL corresponding to the pieces of content H to L (these pieces of content H to L are collectively referred to as a "first level content row LC1 (FIG. 15)") that are located just before and after the piece of selected music content MCS (or the piece of content J) on the all content row LC0: the five thumbnail images SGH to SGL are placed side by side from the left to the right in order of release date as shown in FIG. 16A (this row of the thumbnail images SGH to SGL is also referred to as a "first level image row LG1").

Figure 16B:
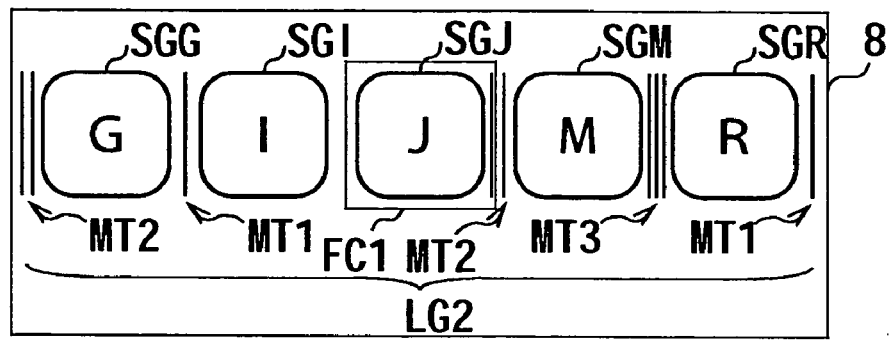

When the zoom change operation of the zoom dial 12 is performed to perform the zoom out display (i.e. to increase the display level), the control section 20 selects the threshold value TH2 corresponding to the weekly display level LV2, and, as shown in FIG. 16B, extracts, from the all content row LC0, the piece of content J (which is the piece of the selected music content MCS, being selected by the focus frame FC1) as a main one and other pieces of content G, I, J, M and R whose priority evaluation values PV are greater or equal to the threshold value TH2 (the row of pieces of music content MC (G, I, J, M and R) are collectively referred to as a "second level content row LC2 (FIG. 15)"). The control section 20 then displays, on the content display section 8, the thumbnail images SGG, SGI, SGJ, SGM and SGR corresponding to the pieces of content G, I, J, M and R: the five thumbnail images SGG, SGI, SGJ, SGM and SGR are placed side by side from the left to the right in order of release date (this row of the thumbnail images SGG, SGI, SGJ, SGM and SGR is also referred to as a "second level image row LG2").

Accordingly, the content display section 8 only displays the thumbnail images SGG, SGI, SGJ, SGM and SGR of the pieces of the extracted music content MCA as a result of removing the pieces of the culled music content MCZ (i.e. the pieces of content H, K, L and the like) whose priority evaluation values PV are less than the threshold value TH2 from the all content row LC0 (FIG. 15). In this case, the size of each thumbnail image SGG, SGI, SGJ, SGM and SGR is almost the same as that of the all display level LV1.

In addition, as shown in FIG. 16B, in a case in which there is the piece of the culled music content MCZ (the piece of content H, for example) on the all content row LC0 between the pieces of the extracted music content MCA (the pieces of content G and I, for example) whose thumbnails images SG are right nest to one another on the second level image row LG2, the control section 20 displays a cull mark MT (MT1, MT2 and MT3) between the thumbnail images SG corresponding to the plurality of pieces of the extracted music content MCA displayed on the content display section 8 to indicate the fact that there is the pieces of culled music content MCZ removed.

For instance, the cull mark MT (MT1, MT2 and MT3) includes one to three vertical lines each of which is right next one another. The number of lines of the cull mark MT is determined based on the number of pieces of the culled music content MCZ: the cull mark MT1 with one line means that there is only one piece of the culled music content MCZ; the cull mark MT2 with two lines means that there are two pieces of the culled music content MCZ; and the cull mark MT3 with three lines means that there are three pieces of culled music content MCZ.

Accordingly, on the second level image row LG2 where the pieces of images are placed in the same order as the all content row LC0 (i.e. in order of release date), the audio device 1 notifies the user of, by the cull mark MT, the fact that there are the pieces of the culled music content MCZ between the pieces of extracted music content MCA whose thumbnail images SG are right nest to one another, and the approximate number of pieces of the culled music content MCZ removed.

By the way, if the zoom dial 12 is rotated several times to the right as the zoom change operation, the control section 20 of the audio device 1 sequentially increases the display level LV, for example, the all display level LV1, the weekly display level LV2, the monthly display level LV3, the annual display level LV4 and the highest evaluation display level LV5 in that order.

In addition, as shown in FIG. 16A, in a case in which the content display section 8 is displaying the first level image row LG1, and the piece of content J is being selected by the focus frame FC1, and then the control section 20 receives a rotation signal SR1 (which corresponds to the rotated angle of the selection dial 11) as a result of rotating the selection dial 11 to the right, the control section 20 switches, in response to the rotation signal SR1, what the focus frame FC1 is selecting (i.e. the piece of the selected music content MCS) from the piece of content J to the piece of content K.

In this case, the focus frame FC1 is fixedly displayed on the content display section 8. Therefore, the first level image row LG1 is scrolled to the left one by one to display new thumbnail images SG. The focus frame FC1 is then placed on the thumbnail image SGK corresponding to the piece of content K. In this manner, the first level image row LG1 is updated.

In this manner, with the audio device 1, the selection operation of selecting thumbnail images SG on the content display section 8 by the selection dial 11 or the zoom dial 12, and the interface action of the audio device 1 in association with the selection operation and zoom change operation are performed while the content display section 8 is displaying them as a display screen.

Figure 17A:
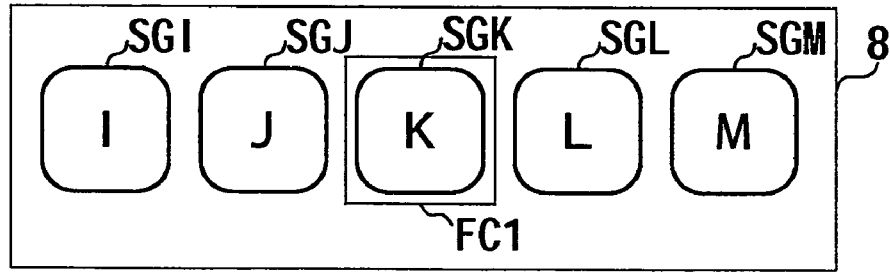
FIGS. 17A through 17C are schematic diagrams illustrating methods of changing selected content.
Figure 17B:
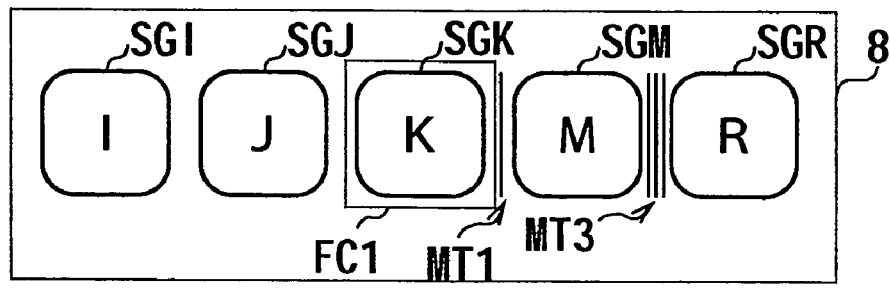

In a case in which the display level LV is set to the all display level LV1 as shown in FIG. 17A, and the piece of content K is being selected by the focus frame FC1, and then the dial operation of the zoom dial 12 is performed to perform the zoom out display, as shown in FIG. 17B, the control section 20 displays, on the center, the thumbnail image SGK of the piece of content K which is equivalent to the piece of the selected music content MCS selected by the focus frame FC1, and then selects the threshold value TH2 corresponding to the weekly display level LV2. The control section 20 subsequently extracts, from the all content row LC0, the pieces of content I, J, M and R whose priority evaluation values PV are greater or equal to the threshold value TH2, and then displays the corresponding thumbnail images SG1, SGJ, SGM and SGR on the content display section 8.

That is to say, when the user performs the zoom change operation to do the zoom out display, the control section 20 displays not only the thumbnail images SG corresponding to the pieces of music content MC whose priority evaluation values PV are greater or equal to the extracted threshold value THA, but the thumbnail image SG corresponding to the piece of the selected music content MCS selected by the focus frame FC1 regardless of its priority evaluation value PV (the thumbnail image SGK is displayed, in this case). Accordingly, even if the displayed information is updated due to the zoom out display, the control section 20 allows the user to keep an eye on the thumbnail image SG corresponding to the piece of the selected music content MCS.

When the piece of the selected music content MCS selected by the focus frame FC1 is specified as a operation target for various kinds of operation, the control section 20 also recognizes the following items as the operation targets: all the pieces of the culled music content MCZ between the piece of the selected music content MCS and the piece of the extracted music content MCA right next to the piece of the selected music content MCS on the content row LC (LC0, LC1, or LC2) corresponding to the current display level LV.

For instance, the display level LV of the control section 20 is set to the weekly display level LV2 as shown in FIG. 16B, and the piece of content J is selected by the focus frame FC1 as the operation target. In this case, when the control section 20 accepts an operation instruction of repeatedly playing back the pieces of music content MC, the control section 20 recognizes the pieces of content K and L, which were culled as the pieces of the culled music content MCZ, as the operation target to be repeatedly played back. The control section 20 therefore repeatedly plays back the pieces of content J, K, L in order of J, K, L, J, K, L, . . .

Figure 17C:
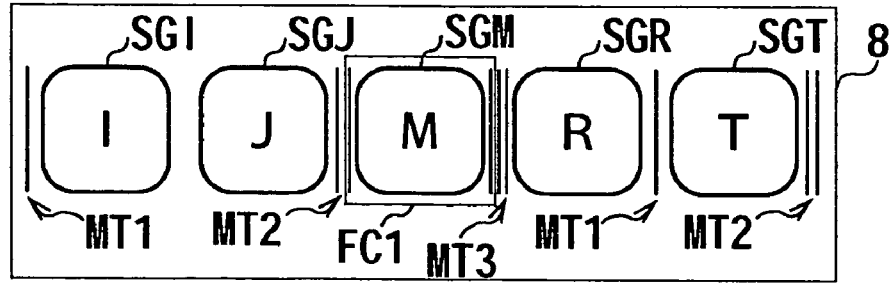

For instance, the content display section 8 displays the second level image row LG2 as shown in FIG. 16B, and the piece of content J is selected by the focus frame FC1. In this case, when the control section 20 of the audio device 1 for example receives the rotation signal SR1 (which corresponds to the rotated angle of the selection dial 11) as a result of the rotation of the selection dial 11 to the right, the control section 20 switches, in response to the rotation signal SR1, what the focus frame FC is selecting to the piece of content M which is on the right side of the piece of content J on the second level content row LC2, as shown in FIG. 17C.

In addition, if the pieces of the culled music content MCZ have been removed from between the pieces of the extracted music content MCA corresponding to the pieces of thumbnail images SG on the updated second level image row LG2, the control section 20 of the audio device 1 displays, in response to the number of pieces of the culled music content MCZ, the cull mark MT (MT1, MT2 or MT3) between the thumbnail images SG corresponding to the pieces of the extracted music content MCA on the content display section 8.

In this manner, the control section 20 of the audio device 1 selects, in response to the user's dial operation of the zoom dial 12, the extracted threshold value THA, and extracts, from the all content row LC0, the pieces of the extracted music content MCA whose priority evaluation values PV are greater or equal to the extracted threshold value THA such that the thumbnail image SG of the piece of the selected music content MCS becomes its center, and displays the thumbnail images SG corresponding to the pieces of the extracted music content MCA on the content display section 8 along with the cull mark MT indicating the fact that there are the pieces of the culled music content MCZ.

(6) Thumbnail Image Display Process

A thumbnail image display process, where the audio device 1 displays the thumbnail images SG on the content display section 8, will be described. In this case, the thumbnail image display process is executed when the zoom change operation of the zoom dial 12 is performed, and when the selection operation of the selection dial 11 is performed.

(6-1) Display Update Process by Zoom Change Operation

Figure 18:
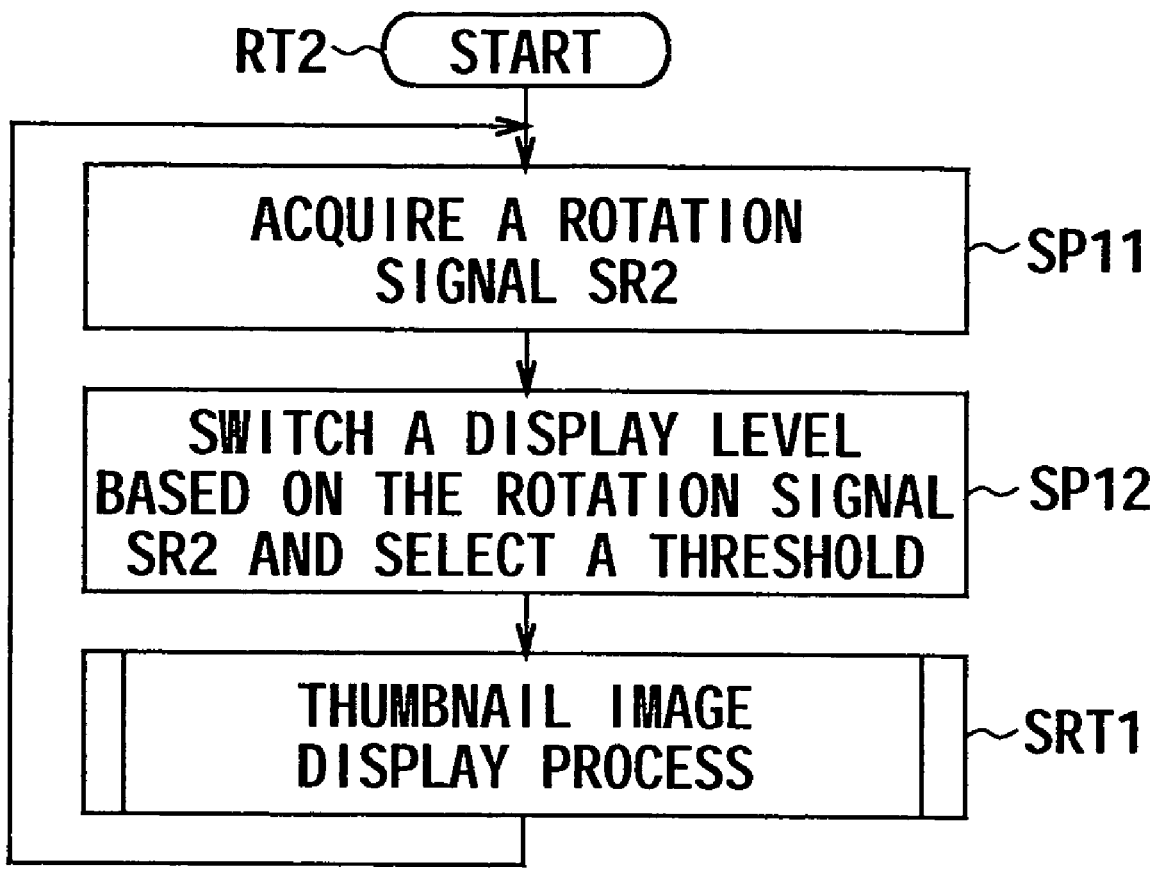
FIG. 18 is a flowchart illustrating a procedure of a display update process of zoom change operation.

After the control section 20 of the audio device 1 is powered on, the control section 20 starts a procedure of a display update process of the zoom change operation RT2 (FIG. 18), and then proceeds to step SP11.

At step SP11, when the user performs the zoom change operation of the zoom dial 12, the control section 20 receives the rotation signal SR2 from the operation input section 27, and then proceeds to next step SP12.

At step SP12, based on the current display level LV (the all display level LV1, for example) and the rotation signal SR2 received from the operation input section 27, the control section 20 is switched to the new display level LV (the weekly display level LV2, for example), and selects the new threshold value TH (the threshold value TH2, for example) as the extracted threshold value THA for the new display level LV, and then proceeds to a subroutine, or a procedure of a thumbnail image display process SRT1.

Figure 19:
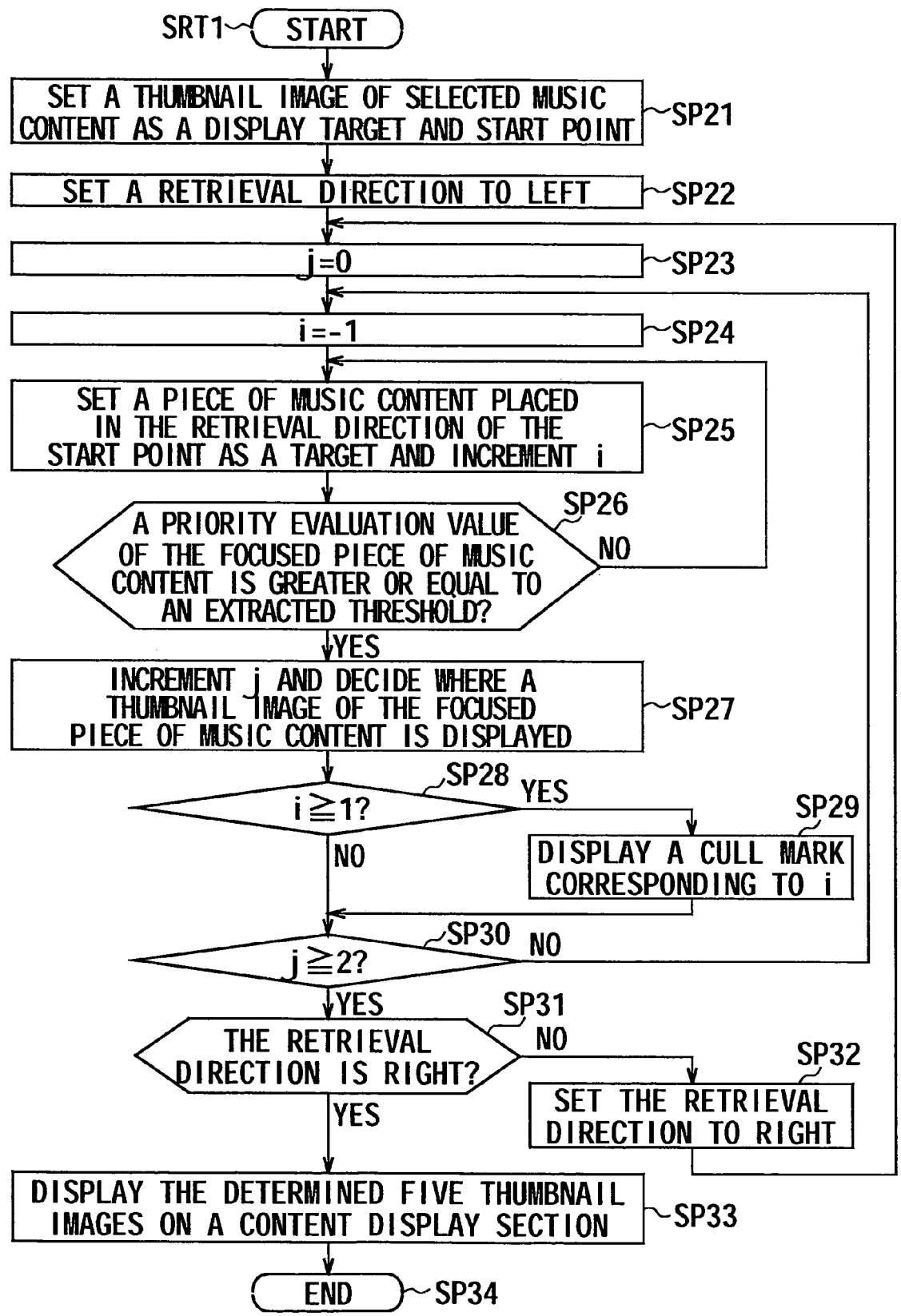
FIG. 19 is a flowchart illustrating a procedure of a thumbnail image display update process.

After starting the procedure of the thumbnail image display process SRT1, the control section 20 proceeds to step SP21, as shown in FIG. 19. At step SP21, the control section 20 selects one piece of music content MC (the piece of content J, for example) from the all content row LC0, and decides the corresponding thumbnail image SG (the thumbnail image SGJ, for example) as the one to be displayed on the approximate center of the content display section 8. At the same time, the control section 20 sets that piece of music content MC as the start point for searching for the piece of music content MC that should be displayed right next to the center thumbnail image in accordance with the display level MC. The control section 20 subsequently proceeds to next step SP22.

At step SP22, the control section 20 decides which direction the control section 20 will perform the retrieval process of retrieving the pieces of the extracted music content MCA on the all content row LC0 from the start point: the retrieval direction is, in this case, set to left, or the direction of going back in the past on the release date. The control section 20 subsequently proceeds to next step SP23.

At step SP23, the control section 20 perform an initialization process of setting a parameter j to zero: the parameter j is used to count the number of thumbnail images SG displayed on the both sides of the thumbnail image SG corresponding to the piece of music content MC that has been set as the start point. The control section 20 subsequently proceeds to next step SP24.

At step SP24, for example, the control section 20 performs an initialization process of setting a parameter i to −1: the parameter i is used to indicate the number of pieces of the culled music content MCZ that are to be removed without being displayed on the both sides of the thumbnail image SG corresponding to the piece of music content MC that has been set as the start point. The control section 20 subsequently proceeds to next step SP25.

At step SP25, out of the all content row LC0, the control section 20 focuses the piece of music content MC that is right next to the piece of music content MC that has been set as the start point in the retrieval direction, and reads out its metadata MTD. The control section 20 also increments the parameter i, and then proceeds to next step SP26. For example, the control section 20 focuses the piece of content I on the right of the piece of content J (the start point is the piece of content J, for example), and sets the parameter i to zero.

At step SP26, the control section 20 checks whether the priority evaluation value PV included in the metadata MTD of the piece of music content MC focused at step SP25 is greater or equal to the extracted threshold value THA which is based on the display level LV.

The affirmative result at step SP26 means that the priority evaluation value PV of the piece of music content MC focused at step SP25 is greater or equal to the extracted threshold value THA, and that this piece of music content MC is equivalent to the extracted music content MCA. In this case, the control section 20 proceeds to next step SP27.

The negative result at step SP26 means that the priority evaluation value PV of the piece of music content MC focused is less than the extracted threshold value THA, and that this piece of music content MC is equivalent to the culled music content MCZ. In this case, the control section 20 returns to step SP25 to keep performing the retrieval process of retrieving the piece of music content MC that should be displayed in the retrieval direction of the piece of music content MC that has been set as the start point until it finds out the piece of music content MC whose priority evaluation value PV is greater or equal to the extracted threshold value THA.

At this time, the control section 20 at step SP25 focuses the next piece of music content MC which is in the retrieval direction of the piece of music content MC equivalent to the culled music content MCZ, and also increments the parameter i.

At step SP27, because it becomes evident at step SP26 that the piece of music content MC focused at step SP25 is equivalent to the extracted music content MCA to be displayed on the content display section 8, the control section 20 increments the parameter j, and decides the thumbnail image SG of the focused piece of music content MC to be displayed on a position which is j pieces away from the piece of music content MC that has been set as the start point in the retrieval direction. The control section subsequently moves to next step SP28.

At step SP28, the control section 20 checks whether the parameter i is greater or equal to one. The affirmative result at step SP28 means that at least one piece of the culled music content MCZ has been already removed until it finds out the thumbnail image SG that should be displayed right next to the thumbnail image SG corresponding to the piece of music content MC set as the start point. In this case, the control section 20 proceeds to next step SP29.

In this case, the parameter i is initially set to −1. Therefore the parameter i shows the number of pieces of the culled music content MCZ removed.

At step SP29, the control section 20 displays, in accordance with the parameter i, the cull mark MT (MT1, MT2 or MT3) on the content display section 8 such that the cull mark MT is placed between the thumbnail image SG set as the start point and the thumbnail image SG of the piece of the extracted music content MCA adjacent to the start-point thumbnail image SG. The control section 20 subsequently proceeds to next step SP30.

The negative result at step SP28 means that it is possible to detect the fact that the piece of music content MC right next to the piece of music content MC set as the start point is the extracted music content MCA, and that any pieces of music content have not been removed as the culled music content MCZ. In this case, the control section 20 proceeds to step SP30 without displaying the cull mark MT on the content display section 8.

At step SP30, the control section 20 checks whether the parameter j is greater or equal to two: it checks whether the two thumbnail images SG have been selected to be displayed in the retrieval direction behind the thumbnail image SG corresponding to the piece of music content MC set as the start point.

The negative result at step SP30 means that the two thumbnail images SG have not been determined to be displayed in the current retrieval direction, and it may continue the retrieval process until the two thumbnail images SG are selected. In this case, the control section 20 returns to step SP24.

The affirmative result at step SP30 means that the two thumbnail images SG have been determined to be displayed in the current retrieval direction, and it may not continue the retrieval process to find more thumbnail images SG. In this case, the control section 20 proceeds to next step SP31.

At step SP31, the control section 20 checks whether the current retrieval direction is the right of the start point, or the right of the piece of music content MC set as the start point. The negative result at step SP31 means that the retrieval direction has been the left of the piece of music content MC set as the start point. It means that the two thumbnail images SG of the two pieces of extracted music content MCA that should be displayed on the right side of the start-point thumbnail image SG have not been determined. In this case, the control section 20 proceeds to next step SP32.

At step SP32, the control section 20 switches the retrieval direction from left to right: it is the direction of going forward in the future on the release date with respect to the piece of music content MC set as the start point. The control section 20 then returns to step SP23 to determine the two thumbnail images SG that should be displayed on the right side of the thumbnail image SG corresponding to the piece of music content MC set as the start point.

The affirmative result at step SP31 means that the four thumbnail images SG to be displayed on the both sides of the thumbnail image SG corresponding to the piece of music content MC set as the start point have been determined. In this case, the control section 20 proceeds to next step SP33.

At step SP33, the control section 20 supplies the five thumbnail images SG determined at step SP31 to the video controller 26A of the display section 26 (FIG. 2) to display the five thumbnail images SG on the content display section 8. The control section 20 subsequently proceeds to next step SP34 to end the procedure of the thumbnail image display process SRT1. After that, the control section 20 returns to step SP11 of the procedure of the display update process RT2 of the zoom change operation (FIG. 18) to repeat a series of process.

By the way, under the control of the control section 20 of the audio device 1, a nonvolatile memory (not shown) memorizes the following information: the information about which piece of music content MC (the selected music content MCS) the focus frame FC1 was selecting immediately before the power supply was cut (the piece of content J, for example); and the information about the display level LV at that time (the all display level LV1, for example). After the audio device 1 is powered on again, the control section 20 reads out the information from the nonvolatile memory and uses it as initialization values about the selected music content MSC and the display level LV. This allows the audio device 1 to display the same items, such as thumbnail images SG, on the content display section 8 as those displayed before the power supply was cut.

(6-2) Display Update Process by Selection Operation

Figure 20:
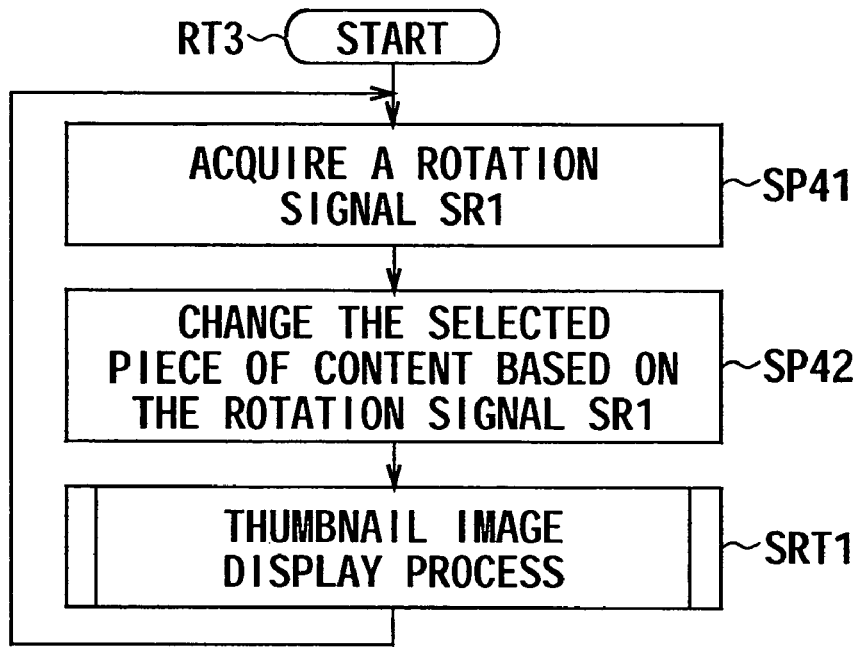
FIG. 20 is a flowchart illustrating a procedure of a display update process of selection operation.

The control section 20 starts a procedure of a display update process RT3 of the selection operation (FIG. 20) when the audio device 1 is powered on. The control section 20 subsequently proceeds to step SP41. At step SP41, the control section 20 receives the rotation signal SR1 from the operation input section 27 as a result of the user's selection operation of the selection dial 11, and then proceeds to next step SP42.

At step SP42, the control section 20 sets, in response to the rotation signal SR1 received from the operation input section 27, the pieces of the extracted music content MCA, which are placed on the right or left side of the piece of the selected music content MCS selected by the focus frame FC1 on the content row LC of this display level LV, as the new pieces of the selected music content MCS, and then proceeds to a subroutine, or the procedure of the thumbnail image display process SRT1.

For example, the display level LV is set to the weekly display level LV2, and the piece of content J is the selected music content MCS. In this case, when the user rotates the selection dial 11 to the right, the control section 20 switches what the focus frame FC1 is selecting (i.e. the selected music content MCS) from the piece of content J to the piece of content M which is on the right side of the piece of content J on the second level content row LC2 (FIG. 15) corresponding to the weekly display level LV2.

In the procedure of the thumbnail image display process SRT1, the control section 20 displays, on the content display section 8, the five thumbnail images SG the center of which is the thumbnail image SG of the piece of the selected music content MCS as mentioned above, and then returns to step SP41 to repeat a series of processes.

(7) Operation and Effect

In the audio device 1 with the above configuration, the control section 20 generates the all content row LC0 in which all pieces of music content MC are arranged in order of release date. The control section 20 also calculates the priority evaluation value PV of each piece of music content MC. The control section 20 selects the extracted threshold value THA in accordance with the display level LV set by the user's zoom change operation. The control section 20 subsequently sets the piece of the selected music content MCS selected by the focus frame FC1 as the start point, and then extracts, from the all content row LC0, the pieces of the extracted music content MCA whose priority evaluation values PV are greater or equal to the extracted threshold value THA. The control section 20 subsequently displays, on the content display section 8, the thumbnail images SG corresponding to the pieces of the extracted music content MCA and the cull mark MT indicating that there are pieces of the culled music content MCZ such that the thumbnail image SG corresponding to the piece of the selected music content MCS is displayed on the center.

Accordingly, regardless of the display level LV set, the maximum number of thumbnail images SG to be displayed on the content display section 8 of the audio device 1 is always the same. In addition, the audio device 1 does not change the size of thumbnail images SG on the content display section 8. This provides easy-to-see thumbnail images SG.

In addition, the audio device 1 removes, from the all content row LC0, the pieces of the culled music content MCZ whose priority evaluation values PV are less than the extracted threshold value THA, and displays the thumbnail images SG corresponding to the rest of them (or the pieces of the extracted music content MCA) on the content display section 8. This maintains relative order of each piece of music content MC with respect to the order of release date, and zooms out only the thumbnail images SG corresponding to the pieces of music content MC that have the high priority evaluation values PV and the user may be fond of. In reality, only five thumbnail images are displayed, however, it seems to the user that the display area for displaying the pieces of music content MC becomes enlarged.

That is to say, when the audio device 1 gradually increases, in response to the zoom change operation of the zoom dial 12, the display levels LV from the all display level LV1 to zoom out, the rotated angle of the zoom dial 12 becomes correlated with the display levels LV. Therefore, in response to the rotated angle of the zoom dial 12, the audio device 1 sequentially culls the pieces of music content MC whose priority evaluation values PV are lower. This user interface allows the user to intuitively operate.

In addition, when the selection operation of the selection dial 11 is performed while the display level LV is high, the audio device 1 sets the piece of music content MC that is right next to the piece of the selected music content MCS on the content row LC corresponding to the current display level LV as new piece of the selected music content MCS. This means that it moves from the piece of the selected music content MCS on the all content row LC0 (FIG. 15) to the piece of the extracted music content MCA that is closest to this piece of the selected music content MCS by skipping the pieces of the culled music content MCZ. Accordingly, one operation moves more in comparison with a low display level where displayed information is zoomed in.

In order for the user to select a different piece of the selected music content MCS by the focus frame FC1, the audio device 1 allows the user to perform both the selection operation of the selection dial 11 and the zoom change operation of the zoom dial 12. This improves efficiency compared to an audio device in which only the selection operation is allowed.

For example, on the audio device 1, to change the piece of the selected music content MCS by the focus frame FC1 from the piece of content J to the piece of content S on the content display section 8 where the thumbnail images SG are displayed in the all display level LV1 as shown in FIG. 16A, the user has to perform the selection operation nine times like J, K, L, . . . , S if he/she is only allowed to perform the selection operation of the selection dial 11.

Figure 21A:
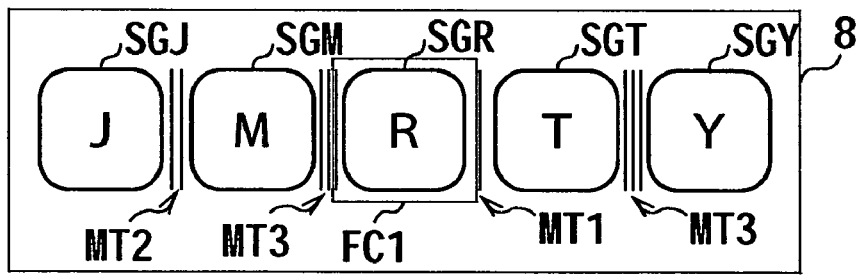
FIGS. 21A through 21C are schematic diagrams illustrating a method of changing a selected piece of content.
Figure 21B:
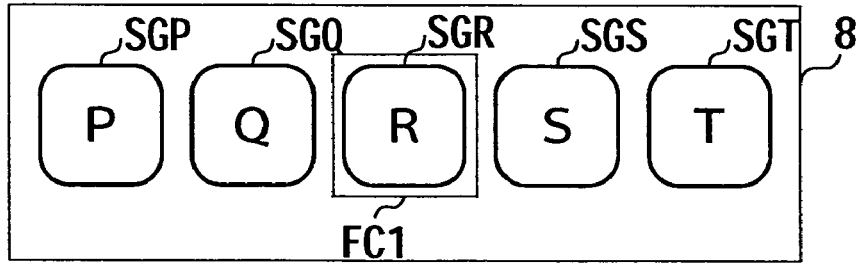
Figure 21C:
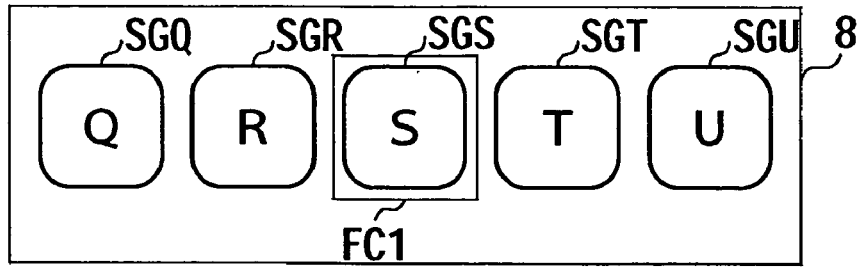

By contrast, on the audio device 1 where the zoom change operation of the zoom dial 12 is allowed, the user switches the display levels LV from the all display level LV1 (FIG. 16A) to the weekly display level LV2 (FIG. 16B) by the zoom change operation (of zooming out, in this case), and performs the selection operation two times to moves the focus frame FC1 from the piece of content J to the piece of content R as show in FIG. 21A, and switches the display levels LV to the all display level LV1 by the zoom change operation of zoom dial 12 (to zoom in, in this case) as shown in FIG. 21B, and then performs the selection operation of the selection dial 11 one time to move the focus frame FC1 from the piece of content R to the piece of the content S as shown in FIG. 21C. In this manner, performing the operations five times, including two zoom change operations and three move operations, can select his/her desired piece of music content. The user can select his/her desired piece of music content with easy and short term operation.

In reality, the audio device 1 selects, in response to the dial operation of the zoom dial 12, the number one pieces of music content MC on the annual ranking, monthly ranking, or weekly ranking, and displays the thumbnail images SG corresponding to the selected pieces of music content MC on the content display section 8 in order of time. This allows the audio device 1 to classify the thumbnail images SG by year, month, week or the like and zoom out them on the content display section 8. In addition, the audio device 1 can change the piece of the selected music content MCS on each display level LV. Accordingly, the user can easily retrieve his/her desired piece of music content MC from many pieces of music content MC (thousands to ten thousands of music content MC, for example).

Furthermore, the audio device 1 displays, between the adjoining thumbnail images SG on the content display section 8, the cull mark (FIG. 16B) indicating that there is a piece of the culled music content MCZ removed from the all content row LC0. Accordingly, the user can visually and intuitively recognize that there is the piece of the culled music content MCZ between two pieces of the extracted music content MCA indicated by the adjoining thumbnail images SG.

Furthermore, one of the cull marks MT1 to MT3 is displayed in accordance with the number of pieces of the culled music content MCZ removed from the all content row LC0. Therefore, the user can understand the approximate number of pieces of the culled music content MCZ. This improves the efficiency of retrieving the desired piece of music content MC, and makes it possible to complete the retrieval process in a short period of time.

Furthermore, on the audio device 1, when the user performs the zoom change operation to do the zoom out display, the control section 20 displays not only the thumbnail images SG corresponding to the pieces of music content MC whose priority evaluation values PV are greater or equal to the extracted threshold value THA, but the thumbnail image SG corresponding to the piece of the selected music content MCS selected by the focus frame FC1 regardless of its priority evaluation value PV. Accordingly, even if the piece of the selected music content MCS is not suitable for the display level LV after the zoom change operation, the control section 20 allows the user to keep an eye on the thumbnail image SG corresponding to the piece of the selected music content MCS.

Furthermore, in a case in which the piece of the selected music content MCS is specified for the operation target of various kinds of operations, the audio device 1 also recognizes, on the content row LC of the current display level, all pieces of the culled music content MCZ between the piece of the selected music content MCS and the next piece of the extracted music content MCA as the operation target. Accordingly, for example, in a case in which the audio device 1 repeatedly plays back or removes the pieces of music content MC, the user can specify a plurality of pieces of music content MC as target at one time without specifying them one by one.

The above configuration makes this possible: the control section 20 of the audio device 1 selects the extracted threshold value THA in accordance with the display level LV set by the user's zoom change operation of the zoom dial 12. The control section 20 subsequently sets the piece of the selected music content MCS as the start point, and then extracts, from the all content row LC0, the pieces of the extracted music content MCA whose priority evaluation values PV are greater or equal to the extracted threshold value THA. The control section 20 subsequently displays, on the content display section 8, the thumbnail images SG corresponding to the pieces of the extracted music content MC and the cull mark MT indicating that there are pieces of the culled music content MCZ such that the thumbnail image SG corresponding to the piece of the selected music content MCS is displayed on the center. This maintains the relative order of each piece of music content MC, and enlarges only the thumbnail images SG corresponding to the pieces of music content MC with the high priority evaluation values PV, which the user may be fond of, so that the user can easily see them.

(8) Other Embodiment

In the above-noted embodiment, as shown in FIG. 16B, the cull mark MT with one to three vertical lines (these lines are next to one another in the horizontal direction) is displayed between the thumbnail images SG. However the present invention is not limited to this. Another shape of cull mark MT may be displayed near each thumbnail image SG.

Figure 22A:
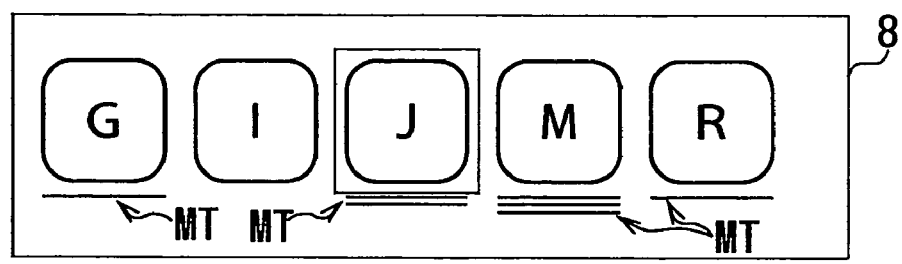
FIGS. 22A through 22F are schematic diagrams illustrating an example of displaying a cull mark according to another embodiment of the present invention (1)
Figure 22B:
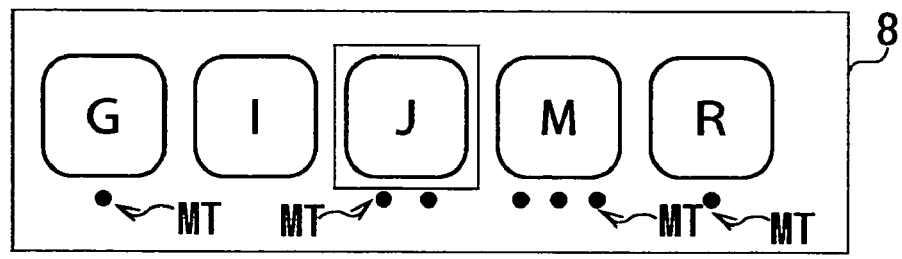
Figure 22C:
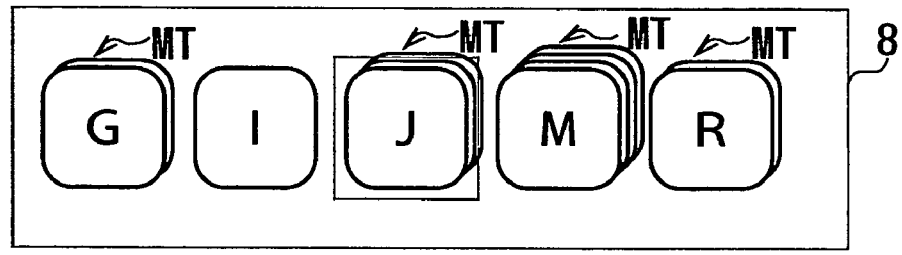

For example, as shown in FIG. 22A, the cull mark MT with one to three horizontal lines (these lines are next to one another in the vertical direction) may be displayed below each thumbnail image SG, and the number of lines may vary according to the number of pieces of the culled music content MCZ. As shown in FIG. 22B, one to three objects in a predetermined shape (in the shape of circle, triangle or the like) may be displayed below each thumbnail image SG, and the number of objects may vary according to the number of pieces of the culled music content MCZ. As shown in FIG. 22C, the cull mark MT, which provides visual effects as if there are other thumbnail images SG behind each thumbnail image SG, may be displayed, and the number of thumbnail images behind may vary according to the number of pieces of the culled music content MCZ.

Figure 22D:
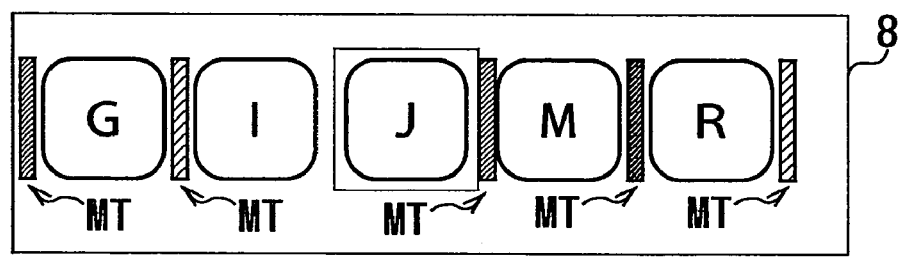
Figure 22E:
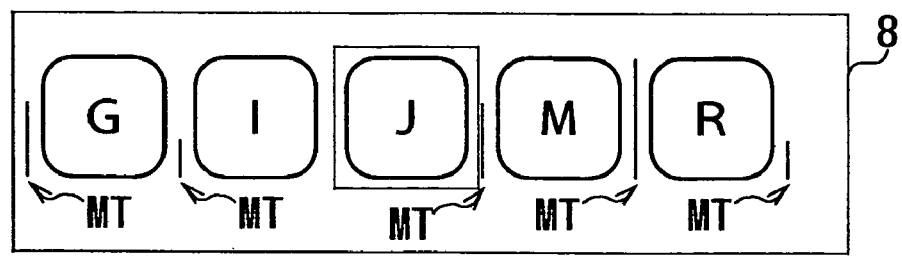
Figure 22F:
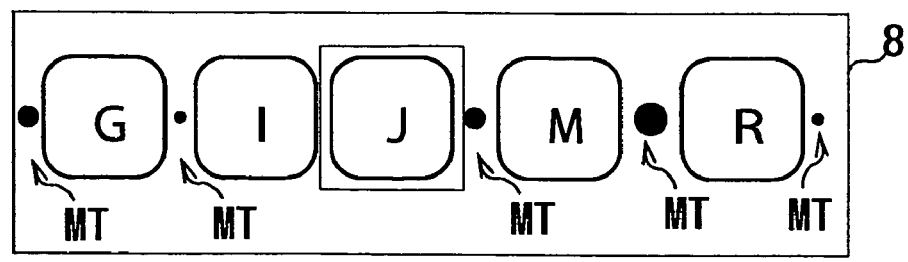

In addition, as shown in FIG. 22D, the cull mark MT in a predetermined shape (in the shape of rectangle, for example) may be displayed between the thumbnail images SG, and its color and brightness may vary according to the number of pieces of the culled music content MCZ. As shown in FIG. 22E, the cull mark MT with one vertical line may be displayed between the thumbnail images SG, and its length may vary according to the number of pieces of the culled music content MCZ. As shown in FIG. 22F, the cull mark MT in a predetermined shape (in the shape of circle) may be displayed, and its size may vary according to the number of pieces of the culled music content MCZ. In this case, the distance between the thumbnail images SG may vary according to the size of the cull mark MT.

Figure 23A:
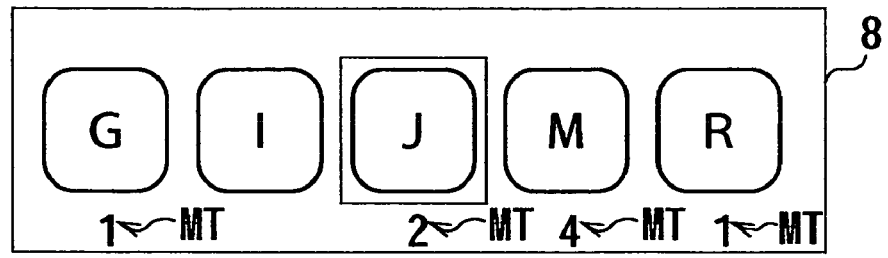
FIGS. 23A and 23B are schematic diagrams illustrating an example of displaying a cull mark according to another embodiment of the present invention (2)
Figure 23B:
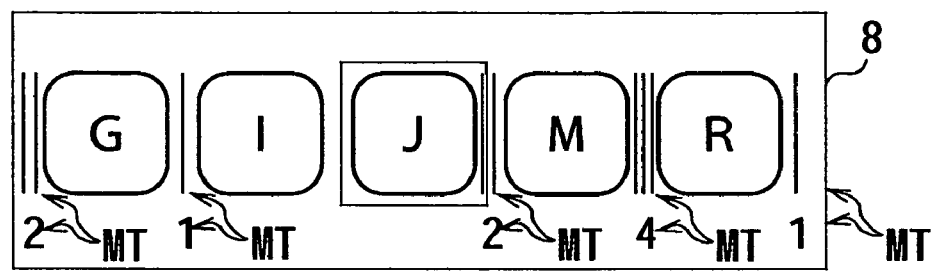

Furthermore, in the above-noted embodiments, the number of vertical lines of the cull mark MT indicates the approximate number of pieces of the culled music content MCZ. However, the present invention is not limited to this. For example, as shown in FIG. 23A, the cull mark MT with numerical numbers may be displayed below the thumbnail images SG. In this case, the numerical characters may directly indicate the number of pieces of the culled music content MCZ. As shown in FIG. 23B, the cull mark MT with several vertical lines and the numerical characters may be displayed.

Figure 24A:
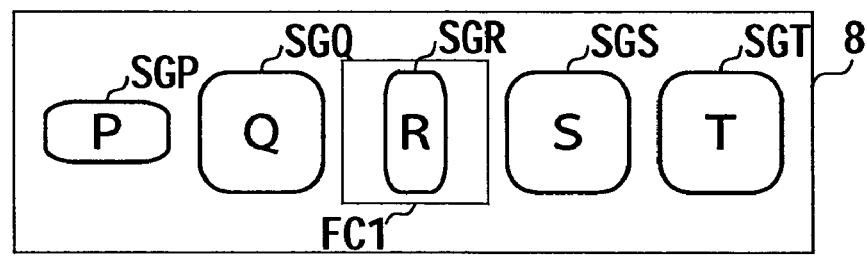
FIGS. 24A and 24B are schematic diagrams illustrating an example of displaying a thumbnail image according to another embodiment of the present invention.
Figure 24B:
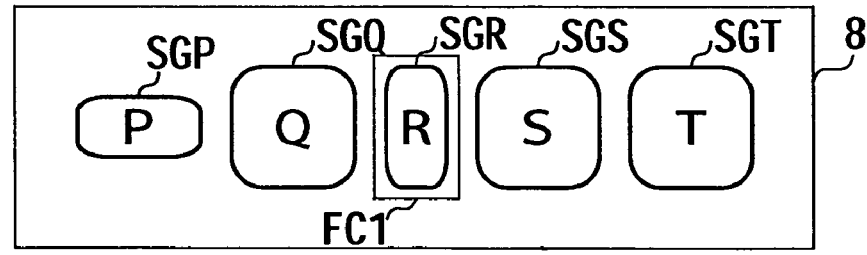

Furthermore, in the above-noted embodiments, the sizes of the thumbnail images SG on the content display section 8 are the same. However the present invention is not limited to this. As shown in FIG. 24A corresponding to FIG. 21B, the horizontal and vertical size of thumbnail images SG may be changed: the thumbnail images SGP with reduced length and the thumbnail images SGR with reduced width may be displayed.

In this case, the center of each thumbnail image SG displayed on the content display section 8 may be fixed as shown in FIG. 24A. Alternatively, the distances between the thumbnail images SG may be always constant.

Furthermore, in the above-noted embodiment, the focus frame FC is fixedly displayed on the substantially center of the content display section 8. However the present invention is not limited to this. For example, the focus frame FC1 may be displayed on the rightmost or leftmost thumbnail images SG on the content display section 8. Instead of the focus frame fixedly displayed, the focus frame FC1 may be move from side to side in accordance with the selection operation of the selection dial 11.

Furthermore, in the above-noted embodiments, the pieces of the extracted music content MCA are extracted, in accordance with the formula (2), by comparing the priority evaluation value PV whose data configuration is like one shown in FIG. 14 with the extracted threshold value THA. However the present invention is not limited to this. The pieces of the extracted music content MCA may be extracted using evaluation values calculated by other methods.

Furthermore, in the above-noted embodiments, the cull mark MT is displayed on the content display section 8 based on the pieces of the culled music content MCZ. However the present invention is not limited to this. The cull mark MT may be not displayed.

Furthermore, in the above-noted embodiments, the display level LV is switched between the five levels: the all display level LV1, the weekly display level LV2, the monthly display level LV3, the annual display level LV4 and the highest evaluation display level LV5. However the present invention is not limited to this. The display level may include four or less, or six or more levels.

In this case, besides the all display level LV1, the weekly display level LV2, the monthly display level LV3, the annual display level LV4 and the highest evaluation display level LV5, there may be a display level LV that extracts the number one and second place pieces of music content MC on each annual ranking to display their thumbnail images SG. In addition, there may be a display level LV that extracts the piece of music content MC whose total sales during each period of ten years is top to display their thumbnail images SG. In this manner, there may be various kinds of display level LV.

Furthermore, in the above-noted embodiments, the pieces of the extracted music content MCA are extracted from the all content row LC0 using the extraction conditions such as thresholds TH1 to TH5. However the present invention is not limited to this. For example, the pieces of the culled music content MCZ may be culled (removed) from the all content row LC0 using the thresholds TH1 to TH5 as cull condition.

Furthermore, in the above-noted embodiments, the cull mark MT varies according to the number of pieces of the culled music content MCZ. However the present invention is not limited to this. The cull mark MT may be always the same regardless of the number of pieces of the culled music content MCZ.

Furthermore, in the above-noted embodiments, all the pieces of music content MC are arranged in order of release data like the all content row LC0 (FIG. 15). However the present invention is not limited to this. The pieces of music content MC may be displayed in various orders, such as Japanese syllabary order, alphabetical order, Greek alphabetical order, order of total sales, order of tempo, and the like.

Furthermore, in the above-noted embodiments, five thumbnail images SG are displayed on the content display section 8. However the present invention is not limited to this. The content display section 8 may display four or less, or six or more thumbnail images SG in accordance with the size and shape of the content display section 8. In this case, the size of thumbnail image SG may be the same even if the display level LV is switched after the zoom change operation.

Figure 25:
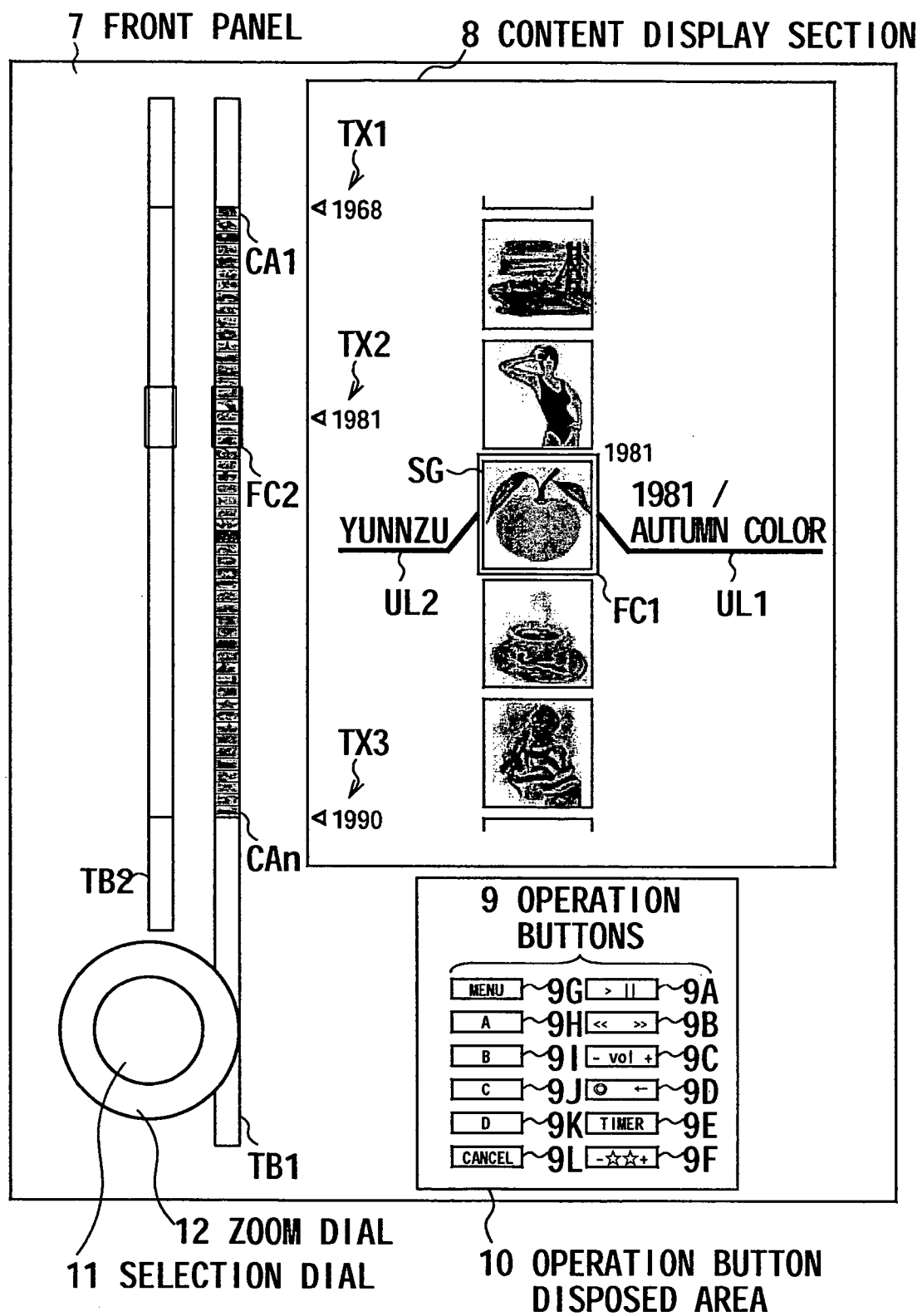
FIG. 25 is a schematic diagram showing the configuration of a front panel (1) according to another embodiment of the present invention.

Furthermore, in the above-noted embodiments, five thumbnail images SG are displayed on the content display section 8 side by side in horizontal direction, and the time axis bar display sections TB1 and TB2 are displayed side by side in horizontal direction. However the present invention is not limited to this. For example, as shown in FIG. 25, the content display section 8, the time axis bar display sections TB1 and TB2 and the like may be placed side by side in vertical direction. In accordance with that, the thumbnail images SB may be also displayed in vertical direction, and the cull mark MT may be displayed between the thumbnail images SG.

Figure 26:
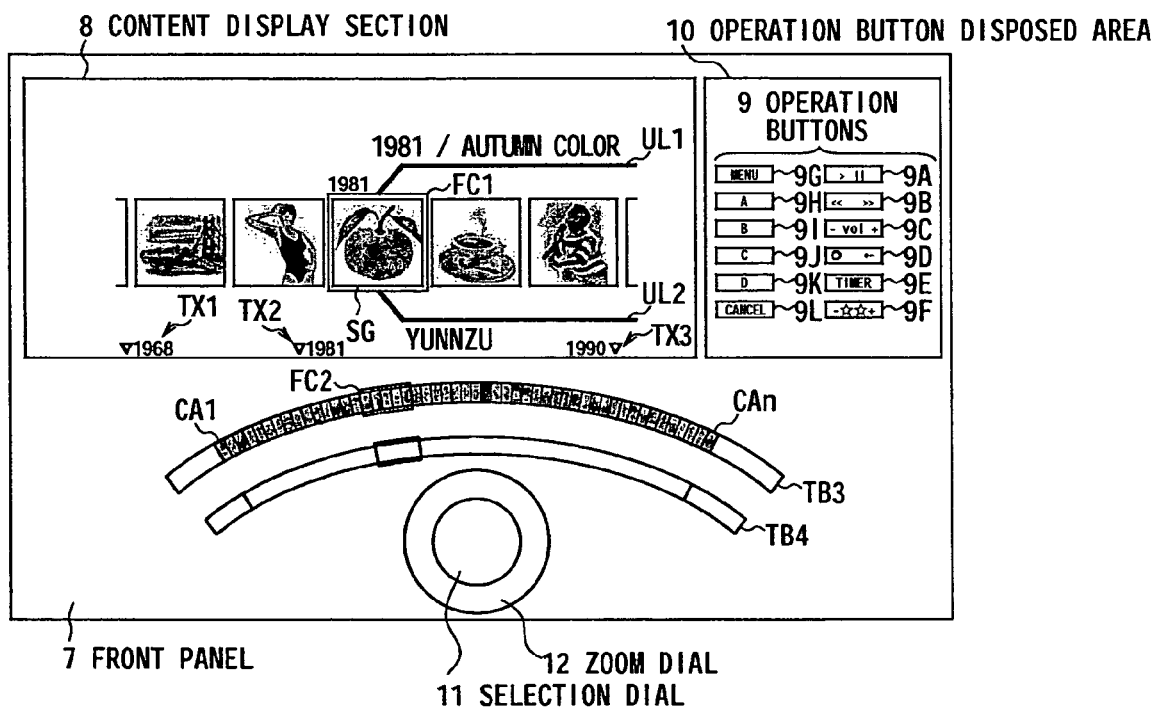
FIG. 26 is a schematic diagram showing the configuration of a front panel (2) according to another embodiment of the present invention.

Furthermore, in the above-noted embodiment, the time axis bar display sections TB1 and TB2 (FIG. 5 and the like) are placed linearly on the front panel 7. However the present invention is not limited to this. The curved time axis bar display sections TB3 and TB4 may be displayed around the selection dial 11 and the zoom dial 12 disposed at the bottom center of the front panel 7 as shown in FIG. 26. In this case, the movements of the selection dial 11 and zoom dial 12 become correlated with that of the focus frame FC2. This improves the usability of the audio device.

Furthermore, in the above-noted embodiments, the audio device 1 that stores and plays back the pieces of music content MC is applied. However the present invention is not limited to this. A content playback device that stores and plays back various content data, such as video data, still image data and text data, may be applied.

Alternatively, a navigation device that indicates a route from a start point to destination on a map may be applied. If the device displays icons such as petrol stations and restaurants on a route from the start point to the destination, it may cull the icons in accordance with the zoom change operation. In this case, their priority evaluation values PV may increase if they are close to the route. Alternatively, their priority evaluation values PV may increase if the user often utilizes them.

Furthermore, an information processing device (such as a personal computer) capable of managing data in flies and managing the files by hierarchical folders may be applied. In this case, the device may switch the layer of folder from one to another in accordance with the zoom change operation, and extracts a representative file from each folder on the switched layer to display them side by side on a screen. In this case, their priority evaluation values PV may increase if their update dates are relatively new. Alternatively, their priority evaluation values PV may increase if the user often utilizes them. In this manner, the files may be extracted and displayed using the priority evaluation values PV.

Furthermore, in the above-noted embodiments, the user rotates the rotatable selection dial 11 (FIG. 11) and the rotatable zoom dial 12 to perform the selection operation and the zoom change operation. However the present invention is not limited to this. For example, the user pushes a selection button and a zoom button, which are the same type of push button as the operation buttons 9, to perform the selection operation and the zoom change operation.

Furthermore, in the above-noted embodiments, the audio device 1 with hardware configuration is applied. However the present invention is not limited to this. For example, an electronic device, such as personal computers and mobile phones capable of playing back music and displaying information, may be applied. In this case, the electronic device may execute an audio player program, a thumbnail image display program and the like to display a content display section whose capability is almost the same as the content display section 8. In addition, the content display section may display thumbnail images SG after culling some of them. In this case, the user may operate keys and a mouse to perform the selection operation and the zoom change operation.

In addition, a storage medium for storing the audio player program, the thumbnail image display program and other programs includes the ROM 20B of the control section 20, the hard disk drive 22 and an external storage medium such as the optical disc 4 and the small memory card 6. The programs stored in the external storage medium may be installed on the hard disk drive 22. Alternatively, the audio player program, the thumbnail image display program and other programs may be acquired through a communication cable such as Universal Serial Bus (USB) cables and "Ethernet (Registered Trademark)" cables, or a wireless Local Area Network (LAN) such as IEEE 802.11 a/b/g (IEEE: Institute of Electrical and Electronics Engineers).

Furthermore, in the above-noted embodiments, the audio device 1, which is equivalent to the data display apparatus, includes: the display condition setting section 20D, which is equivalent to extraction condition setting means; and the arrangement section 20E, which is equivalent to extraction data display means. However the present invention is not limited to this. The data display apparatus may be equipped with other circuit components which are equivalent to the extraction condition setting means and the extraction data display means.

The data display apparatus, data display method, data display program and graphical user interface according to an embodiment of the present information may be also applied to various content playback devices capable of playing back various kinds of content.

It should be understood by those skilled in the art that various modifications, combinations, sub-combinations and alterations may occur depending on design requirements and other factors insofar as they are within the scope of the appended claims or the equivalents thereof.

What is claimed is:

1. A data display apparatus comprising at least memory and a processor, the data display apparatus comprising:
    extraction condition setting means for setting, based on an original data row where a plurality of images stored in the memory, each of the images associated with a respective music piece of a plurality of music pieces, are arranged, by the processor, in a predetermined order, an extraction condition that defines which of the images to extract, by the processor, as extraction data that is to be displayed on a-display section;
    extraction data display means for displaying, in an extraction data row where said extraction data extracted from said original data row based on said extraction condition are arranged in said predetermined order, said extraction data that are within a predetermined range in a predetermined display size on said display section; and
    cull information display means for displaying cull information near said extraction data, said cull information indicating that data near said extraction data has been removed from the original data row, wherein
    said extraction condition setting means sets said extraction condition using a predetermined threshold of an evaluation value set for each image in the original data row, wherein each image is associated with a music piece, and wherein the evaluation value is based on metadata stored along with the music piece.

2. The data display apparatus according to claim 1, wherein the cull information display means displays the cull information if adjoining two images from the extraction data on said display section do not adjoin one another in said original data row, the cull information is displayed near said two images on said display section, said cull information representing a number of images of said data between said two images from the extraction data has been removed from said original data row.

3. The data display apparatus according to claim 2, wherein said cull information display means displays different cull information in accordance with a number of said data between said two images in said original data row.

4. The data display apparatus according to claim 3, wherein said cull information is a numeric character indicating the number of said data between said two images in said original data row.

5. The data display apparatus according to claim 2, wherein said cull information display means displays said cull information substantially midway between said two images on said display section.

6. The data display apparatus according to claim 5, wherein said cull information is a linearly-shaped figure that is substantially vertical to an array direction of said extraction data row on said display section.

7. The data display apparatus according to claim 6, wherein a number of said linearly-shaped figures of said cull information is determined based on a number of said data between said two images in said original data row.

8. The data display apparatus according to claim 1, further comprising
rotatable operation means for accepting amount of rotation by a user as operating instructions, wherein said extraction condition setting means sets said extraction condition based on the amount of rotation of said rotatable operation means.

9. The data display apparatus according to claim 1, wherein the extraction data is displayed on the display section in a zoomed out size.

10. The data display apparatus according to claim 1, wherein the predetermined order comprises a chronological order.

11. The data display apparatus according to claim 1, further comprising
rotatable operation section for accepting amount of rotation by a user as operating instructions, wherein the cull condition setting section sets the cull condition based on the amount of rotation of the rotatable operation section.

12. A data display apparatus comprising at least memory and a processor, the data display apparatus comprising:
a cull condition setting section that sets a cull condition to cull exclusion data that a display section does not display from an original data row where a plurality of images stored in the memory each associated with a respective music piece of a plurality of music pieces are arranged, by the processor, in a predetermined order; and
an extraction data display section that displays, in an extraction data row where images of the plurality of images obtained by culling the exclusion data from the original data row based on the cull condition are arranged in the predetermined order, the images that are within a predetermined range, wherein a center image of the images is within a predetermined focus frame in a predetermined display size on the display section,
wherein the cull condition is based on ranking of the plurality of music pieces according to a popularity during a period of time.

13. The data display apparatus according to claim 12, further comprising cull information display section for displaying cull information near the exclusion data, the cull information indicating that data near the exclusion data has been removed from the original data row.

14. The data display apparatus according to claim 13, wherein the cull information display section displays the cull information if adjoining two images from the exclusion data on the extraction data display section do not adjoin one another in the original data row, the cull information is displayed near the two images on the display section, the cull information representing a number of images of the data between the two images from the extraction data that has been removed from the original data row.

15. The data display apparatus according to claim 14, wherein the cull information display section displays different cull information in accordance with a number of the data between the two images in the original data row.

16. The data display apparatus according to claim 15, wherein
the cull information comprises a numeric character indicating the number of the data between the two images in the original data row.

17. The data display apparatus according to claim 14, wherein
the cull information display section displays the cull information substantially midway between the two images on the display section.

18. The data display apparatus according to claim 17, wherein
the cull information comprises at least one linearly-shaped figure that is substantially vertical to an array direction of the extraction data row on the display section.

19. The data display apparatus according to claim 18, wherein
a number of the at least one linearly-shaped figure of the cull information is determined based on a number of the data between the two images in the original data row.

20. The data display apparatus according to claim 12, wherein the extraction data is displayed on the display section in a zoomed out size.

21. The data display apparatus according to claim 12, wherein the period of time comprises at least one of a week, a month and a year.

22. A method for displaying data, the method comprising:
with at least one processor:
setting, based on an original data row where a plurality of images stored in memory are arranged in a predetermined order, an extraction condition that defines which of the plurality of images to extract as extraction data that is to be displayed on a display section, wherein each image of the plurality of images is associated with a respective music piece of a plurality of music pieces;
displaying, in an extraction data row, the extraction data extracted from the original data row based on the extraction condition, the displayed extraction data are arranged in the predetermined order; and
displaying cull information near the displayed extraction data, the cull information indicating that data near the extraction data has been removed from the original data row, wherein
the extraction condition is set using a predetermined threshold of an evaluation value set for each image in the original data row, and
each image in the original data row is associated with a music piece and wherein the evaluation value is based on metadata stored along with the music piece.

23. A method for displaying data, the method comprising:
with at least one processor:
- setting a cull condition to cull exclusion data from an original data row comprising a plurality of images arranged in a predetermined order and stored in memory, each image from the plurality of images is associated with a respective music piece of a plurality of music pieces, wherein the cull exclusion data is not displayed on a display section; and
- displaying, in an extraction data row where images of the plurality of images obtained by culling the exclusion data from the original data row based on the cull condition are arranged in the predetermined order, the images that are within a predetermined range, wherein a center image of the images that are within the predetermined range is within a predetermined focus frame in a predetermined display size on the display section, wherein the cull condition is based on ranking of the plurality of music pieces according to a popularity during a period of time.

* * * * *